United States Patent
Zong et al.

(10) Patent No.: US 12,267,735 B2
(45) Date of Patent: Apr. 1, 2025

(54) COMMUNICATION METHOD AND APPARATUS

(71) Applicant: HUAWEI TECHNOLOGIES CO., LTD., Guangdong (CN)

(72) Inventors: Zaifeng Zong, Nanjing (CN); Qi Yao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 17/737,845

(22) Filed: May 5, 2022

(65) Prior Publication Data
US 2022/0272584 A1 Aug. 25, 2022

Related U.S. Application Data

(63) Continuation of application No. PCT/CN2020/125572, filed on Oct. 30, 2020.

(30) Foreign Application Priority Data

Nov. 8, 2019 (CN) .......................... 201911087422.6
Dec. 28, 2019 (CN) .......................... 201911385400.8

(51) Int. Cl.
*H04W 36/00* (2009.01)
*H04W 36/14* (2009.01)

(52) U.S. Cl.
CPC . *H04W 36/0044* (2013.01); *H04W 36/00226* (2023.05); *H04W 36/0066* (2013.01); *H04W 36/144* (2023.05)

(58) Field of Classification Search
CPC ....... H04W 36/0044; H04W 36/00226; H04W 36/0066; H04W 36/144; H04W 36/0027; H04W 36/0033
See application file for complete search history.

(56) References Cited

U.S. PATENT DOCUMENTS

2020/0383151 A1* 12/2020 Wang ................ H04W 36/0066
2021/0368408 A1* 11/2021 Deng .................... H04W 60/04

FOREIGN PATENT DOCUMENTS

| CN | 108513726 A | 9/2018 |
| CN | 109819481 A | 5/2019 |
| CN | 110022581 A | 7/2019 |

(Continued)

OTHER PUBLICATIONS

Ericsson, "5GS Interworking Indication When MME Change," 3GPP TSG-CT WG4 Meeting #94, C4-194299, Oct. 7-11, 2019, 29 pages (Year: 2019).*

(Continued)

*Primary Examiner* — Chae S Lee
(74) *Attorney, Agent, or Firm* — Fish & Richardson P.C.

(57) ABSTRACT

Embodiments of this application disclose a communication method and apparatus, and the communication method and apparatus are applicable to a system for interworking between a first network and a second network. In one example, a first access management network element in the first network sends indication information to a session management network element in the first network, so that the session management network element feeds back context information corresponding to a bearer that a second access management network element in the second network supports.

20 Claims, 13 Drawing Sheets

(56) References Cited

FOREIGN PATENT DOCUMENTS

| | | | |
|---|---|---|---|
| CN | 110022593 A | | 7/2019 |
| EP | 3487217 A1 | | 5/2019 |
| EP | 3487271 A1 | | 5/2019 |
| WO | 2018146056 A1 | | 8/2018 |
| WO | 2018206647 A1 | | 11/2018 |
| WO | WO-2019157732 A1 | * | 8/2019 |

OTHER PUBLICATIONS

Huawei et al., "Number of EBIs," 3GPP TSG-WG SA2 Meeting #136, S2-1911274, Reno, NV, USA, Nov. 18-22, 2019, 10 pages.
Office Action in Japanese Appln. No. 2022-526459, dated Apr. 17, 2023, 5 pages (with English translation).
MediaTek Inc., "Handling of QoS Flow Description Without Valid EPS Bearer Context," 3GPP TSG CT WG1 Meeting #114, C1-190300, Bratislava, Slovakia, Jan. 21-25, 2019, 9 pages.
Secretary of SA WG2, "Draft Report of SA WG2 meetings #127," SA WG2 Meeting #127, Apr. 16-20, 2018, Sanya, P. R. China, 479 pages.
Huawei et al., "Number of EBIs," 3GPP TSG-WG SA2 Meeting #136, S2-1912122, Reno, Nevada, USA, Nov. 18-22, 2019, 11 pages.
3GPP TS 23.501 V16.2.0, "3rd Generation Partnership Project; Technical Specification Group Services and System Aspects; System Architecture for the 5G System (5GS); Stage 2 (Release 16)," Sep. 2019, 391 pages.
NTT Docomo et al., "Slice Limitation Correction Based on Rel-15 EPC Extensions," SA WG2 Meeting #128-Bis, S2-187724, Sophia Antipolis, France, Aug. 20-24, 2018, 5 pages.
3GPP TS 23.502 V16.2.0, "3rd Generation Partnership Project; Technical Specification Group Services and System Aspects; Procedures for the 5G System (5GS); Stage 2 (Release 16)," Sep. 2019, 525 pages.
Ericsson, "5GS Interworking Indication When MME Change," 3GPP TSG-CT WG4 Meeting #94, C4-194299, Oct. 7-11, 2019, 29 pages.
3GPP TS 23.401 V16.4.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 16)," Sep. 2019, 423 pages.
Ericsson et al., "Not Supporting 15 EPS Bearers at 5GS to EPS Mobility," 3GPP TSG-WG SA2 Meeting #137E, S2-2002444, Feb. 24-27, 2020, 12 pages.
Office Action in Chinese Appln. No. 201911385400.8, dated Nov. 2, 2021, 16 pages (with English translation).
Extended European Search Report in European Appln No. 20886081.7, dated Nov. 18, 2022, 11 pages.
International Search Report and Written Opinion in International Appln. No. PCT/CN2020/125572, mailed on Jan. 29, 2021, 18 pages (with English translation).

* cited by examiner

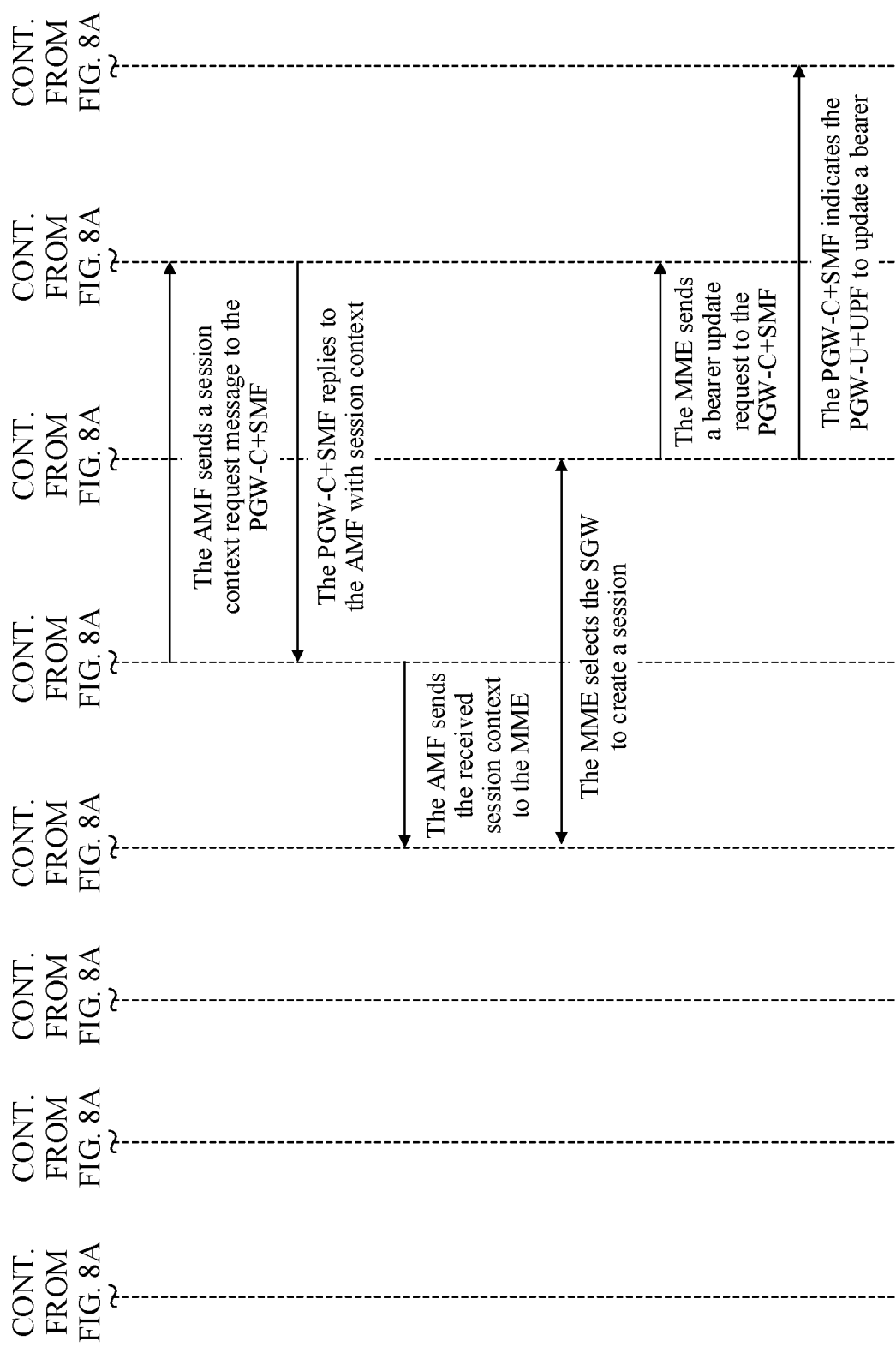

COMMUNICATION METHOD AND APPARATUS

CROSS-REFERENCE TO RELATED APPLICATION

This application is a continuation of International Application No. PCT/CN2020/125572, filed on Oct. 30, 2020, which claims priority to Chinese Patent Application No. 201911385400.8, filed on Dec. 28, 2019, which claims priority to Chinese Patent Application No. 201911087422.6, filed on Nov. 8, 2019. The disclosure of the aforementioned applications are hereby incorporated by reference in their entireties.

TECHNICAL FIELD

Embodiments of this application relate to the communication field, and in particular, to a communication method and apparatus.

BACKGROUND

With rapid development of communication technologies, a 5th generation (5G) communication technology emerges. To accelerate deployment of a 5G network, a system architecture for interworking between a 4th generation (4G) network and the 5G network may be used. The system architecture supports a terminal device in accessing both the 5G network and the 4G network.

4G standards specify that an MME supports a maximum of 11 bearers, and each bearer corresponds to one bearer identity. However, more bearers can be supported in 5G standards, for example, 15 bearers can be supported. In this scenario, how to ensure handover between the 5G network and the 4G network is an urgent technical problem to be resolved.

SUMMARY

Embodiments of this application provide a communication method, to increase a success rate for a terminal to move from a first network to a second network.

According to a first aspect, an embodiment of this application provides a communication method. The method may be performed by a first access management network element in a first network, may be performed by a chip used in a first access management network element, or may be performed by another combined component having a function of a first access management network element. For example, the method is performed by the first access management network element. The first access management network element sends indication information to a session management network element in the first network, where the indication information is used to indicate the session management network element to feed back context information corresponding to a bearer of a terminal in a second network. The bearer is a bearer that a second access management network element in the second network supports. The first access management network element receives, from the session management network element, the context information corresponding to the bearer. The first access management network element sends the context information corresponding to the bearer to the second access management network element in the second network, where the context information corresponding to the bearer is used to indicate the terminal to move from the first network to the second network. According to the communication method, the session management network element feeds back only the context information corresponding to the bearer that the second access management network element supports, so that the second access management network element receives only the context information corresponding to the bearer that the second access management network element supports. This helps increase a success rate for the terminal to move from the first network to the second network.

In a possible design, the indication information includes a quantity of bearers that the second access management network element supports;

the indication information includes that a quantity of bearers of the first network exceeds a quantity of bearers that the second access management network element supports; or the indication information includes that the second access management network element does not support an extended bearer identity. The indication information is used to indicate the session management network element to feed back the context information corresponding to the bearer of the terminal in the second network. A name or a form of the indication information is not limited in this embodiment.

In a possible design, the indication information includes a bearer identity of a first bearer, and the first bearer is a bearer that the second access management network element supports or does not support.

In a possible design, before the first access management network element sends the indication information to the session management network element, the first access management network element determines the indication information, where the indication information includes the bearer identity of the first bearer.

In a possible design, the quantity of bearers that the second access management network element supports is less than a maximum quantity of bearers that the second access management network element is allowed to support.

In a possible design, a value of a bearer identity allocated by the first access management network element is within a range of a value of a bearer identity that the second access management network element is allowed to support, and a quantity of allocated bearer identities does not exceed the quantity of bearers that the second access management network element supports.

In a possible design, there is at least one bearer identity, allocated by the first access management network element, whose value is within a range of a value of a bearer identity that the second access management network element is allowed to support; and there is at least one bearer identity, allocated by the first access management network element, whose value is within a range of a value of a bearer identity that the second access management network element does not support. A bearer identity whose value is within the range of the value of the bearer identity that the second access management network element does not support is not a bearer identity of a default bearer.

In a possible design, there is at least one bearer identity, allocated by the first access management network element, whose value is within a range of a value of a bearer identity that the second access management network element is allowed to support; and there is at least one bearer identity, allocated by the first access management network element, whose value is within a range of a value of a bearer identity that the second access management network element does not support. A bearer identity whose value is within the range of the value of the bearer identity that the second access management network element does not support is a bearer identity of a default bearer.

In a possible design, the indication information may be an indication indicating whether the second access management network element in the second network supports an extended bearer identity.

In a possible design, the indication information is carried in a session context request message. The first access management network element may send the session context request message to the session management network element, where the session context request message includes the indication information.

In a possible design, second indication information is carried in a session context request message, and the second indication information is used to indicate the terminal to move from the first network to the second network; or the second indication information is used to indicate the terminal to be handed over from the first network to the second network.

In a possible design, the first access management network element determines the second access management network element;

the first access management network element determines a quantity of bearers that the second access management network element supports; or the first access management network element determines a range of bearer identities that the second access management network element supports.

In a possible design, the first access management network element receives a handover request message sent by an access network device in the first network, where the handover request message is used to request for handover from the first network to the second network.

In a possible design, the first access management network element receives a session context request message sent by the second access management network element in the second network.

According to a second aspect, an embodiment of this application provides a communication method. The method may be performed by a session management network element in a first network, may be performed by a chip used in a session management network element, or may be performed by another combined component having a function of a session management network element. For example, the method is performed by the session management network element. The session management network element receives indication information sent by a first access management network element in the first network. The indication information is used to indicate the session management network element to feed back context information corresponding to a bearer of a terminal in a second network. The bearer is a bearer that a second access management network element in the second network supports. The session management network element sends context information corresponding to the bearer to the first access management network element. According to the communication method, the session management network element feeds back, based on the indication information, only the context information corresponding to the bearer that the second access management network element supports, so that the second access management network element receives only the context information corresponding to the bearer that the second access management network element supports. This can increase a success rate for the terminal to move from the first network to the second network.

In a possible design, the indication information includes a quantity of bearers that the second access management network element supports;

the indication information includes that a quantity of bearers of the first network exceeds a quantity of bearers that the second access management network element supports; or the indication information includes that the second access management network element does not support an extended bearer identity. The indication information is used to indicate the session management network element to feed back the context information corresponding to the bearer of the terminal in the second network. A name or a form of the indication information is not limited in this embodiment.

In a possible design, the indication information includes a bearer identity of a first bearer, and the first bearer is a bearer that the second access management network element supports or does not support.

In a possible design, the indication information is carried in a session context request message.

In a possible design, second indication information is carried in a session context request message, and the second indication information is used to indicate the terminal to move from the first network to the second network; or the second indication information is used to indicate the terminal to be handed over from the first network to the second network.

In a possible design, the indication information is further used to indicate to allocate tunnel information corresponding to the bearer that the second access management network element in the second network supports.

According to a third aspect, an embodiment of this application provides a communication method. The method may be performed by a first access management network element in a first network, may be performed by a chip used in a first access management network element, or may be performed by another combined component having a function of a first access management network element. For example, the method is performed by the first access management network element. The first access management network element sends indication information to a session management network element in the first network. The indication information is used to indicate the session management network element to release context information corresponding to a first bearer of a terminal in a second network. The first bearer is a bearer that the second access management network element does not support. The first access management network element sends a session context request message to the session management network element. The first access management network element receives context information corresponding to a second bearer from the session management network element, where the second bearer is a bearer that the second access management network element supports. The first access management network element sends session context information corresponding to the second bearer to the second access management network element in the second network, where the session context information corresponding to the second bearer is used to indicate the terminal to move from the first network to the second network. According to the communication method, the first access management network element sends the indication information, so that the session management network element to release context information corresponding to a bearer that the second access management network element does not support. In this case, when requesting session context from the session management network element, the first access management network element receives only the context information corresponding to the bearer that the second access management network element supports. This can increase a success rate for the terminal to move from the first network to the second network.

In a possible design, the indication information includes that the second access management network element in the second network does not support an extended bearer identity.

In a possible design, the indication information is carried in a session context update request message.

In a possible design, second indication information is carried in a session context update request message, and the second indication information is used to indicate the terminal to move from the first network to the second network; or the second indication information is used to indicate the terminal to be handed over from the first network to the second network.

In a possible design, the first access management network element determines the second access management network element;

the first access management network element determines a quantity of bearers that the second access management network element supports; or the first access management network element determines a range of bearer identities that the second access management network element supports.

In a possible design, the first access management network element receives a handover request message sent by an access network device in the first network, where the handover request message is used to request for handover from the first network to the second network.

In a possible design, the first access management network element receives a session context request message sent by the second access management network element in the second network.

According to a fourth aspect, an embodiment of this application provides a communication apparatus. The apparatus has a function of implementing the communication method provided in the first aspect. The function may be implemented by hardware, or may be implemented by hardware executing corresponding software. The hardware or the software includes one or more modules corresponding to the function.

According to a fifth aspect, an embodiment of this application provides a communication apparatus. The apparatus has a function of implementing the communication method provided in the second aspect. The function may be implemented by hardware, or may be implemented by hardware executing corresponding software. The hardware or the software includes one or more modules corresponding to the function.

According to a sixth aspect, an embodiment of this application provides a communication apparatus. The apparatus has a function of implementing the communication method provided in the third aspect. The function may be implemented by hardware, or may be implemented by hardware executing corresponding software. The hardware or the software includes one or more modules corresponding to the function.

According to a seventh aspect, an embodiment of this application provides a communication apparatus. The communication apparatus includes a processor, configured to implement the function or the method in the first aspect. The communication apparatus may be, for example, a chip system. In a feasible implementation, the communication apparatus further includes a memory. The memory is configured to store program instructions and data that are necessary for implementing the function of the method in the first aspect.

According to an eighth aspect, an embodiment of this application provides a communication apparatus. The communication apparatus includes a processor, configured to implement the function or the method in the second aspect. The communication apparatus may be, for example, a chip system. In a feasible implementation, the communication apparatus further includes a memory. The memory is configured to store program instructions and data that are necessary for implementing the function of the method in the second aspect.

According to a ninth aspect, an embodiment of this application provides a communication apparatus. The communication apparatus includes a processor, configured to implement the function or the method in the third aspect. The communication apparatus may be, for example, a chip system. In a feasible implementation, the chip system further includes a memory. The memory is configured to store program instructions and data that are necessary for implementing the function of the method in the third aspect.

According to a tenth aspect, an embodiment of this application provides a communication system. The communication system includes the communication apparatus provided in the seventh aspect and the communication apparatus provided in the eighth aspect. Alternatively, the communication system includes the communication apparatus provided in the eighth aspect and the communication apparatus provided in the ninth aspect.

According to an eleventh aspect, an embodiment of this application provides a computer-readable storage medium. The computer-readable storage medium includes a program or instructions, and when the program or the instructions is or are run on a computer, the computer is enabled to perform the method in any one of the first aspect or the possible implementations of the first aspect.

According to a twelfth aspect, an embodiment of this application provides a computer-readable storage medium. The computer-readable storage medium includes a program or instructions, and when the program or the instructions is or are run on a computer, the computer is enabled to perform the method in any one of the second aspect or the possible implementations of the second aspect.

According to a thirteenth aspect, an embodiment of this application provides a computer-readable storage medium. The computer-readable storage medium includes a program or instructions, and when the program or the instructions is or are run on a computer, the computer is enabled to perform the method in any one of the third aspect or the possible implementations of the third aspect.

The chip system in the foregoing aspects may be a system on chip (SOC), may be a baseband chip, or the like. The baseband chip may include a processor, a channel encoder, a digital signal processor, a modem, an interface module, or the like.

According to a fourteenth aspect, an embodiment of this application provides a chip or a chip system. The chip or the chip system includes at least one processor and a communication interface, and the communication interface and the at least one processor are connected to each other through a line. The at least one processor is configured to run a computer program or instructions, to perform the method described in any one of the first aspect or the possible implementations of the first aspect, perform the method described in any one of the second aspect or the possible implementations of the second aspect, or perform the method described in any one of the third aspect or the possible implementations of the third aspect.

The communication interface on the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

BRIEF DESCRIPTION OF DRAWINGS

To describe technical solutions in the embodiments of this application more clearly, the following briefly describes the accompanying drawings for describing the embodiments.

FIG. 8A and FIG. 8B are a schematic flowchart of a communication method applied to a scenario 2 according to an embodiment of this application;

DESCRIPTION OF EMBODIMENTS

The following describes technical solutions in the embodiments of this application with reference to the accompanying drawings in the embodiments of this application.

Before the embodiments of this application are described, related background technologies are first described.

A $4^{th}$ generation (4G) mobile communication technology has a capability of quick transmission of voice, text, video, and image information, and is currently applied to a wide range of scenarios such as a communication network, the internet of vehicles, and the internet of things. A long term evolution (LTE) technology mainly focuses on long term evolution of a 3GPP radio access network, where an evolved universal terrestrial radio access network (E-UTRAN) is an access network of an LTE network. IP transmission is used between base stations (for example, eNBs) in the E-UTRAN at a bottom layer, and the base stations are logically connected to each other through X2 interfaces. Such a network structure design can support mobility of a terminal device in an entire network, and ensure seamless handover of the user. A system architecture evolution (SAE) technology mainly focuses on long term evolution of a core network, and defines an all—internet protocol (IP) evolved packet core (EPC) network. The EPC core network uses a two-layer flat network structure to implement separation of control and bearers. The EPC core network does not have a circuit domain, and the all-IP EPC supports unified access of various technologies and can flexibly support VoIP and IMS-based multimedia services, thereby implementing an IP-based network.

With evolution of mobile communication technologies, a 5th generation (5G) mobile communication technology emerges. Concepts such as network slice and service-oriented framework are proposed in a 5G network system. One network slice is used to support communication service requirements of a type of user cases or one use case. The entire 5G system includes a large quantity of network slices. In the 5G network system, slicing processing may be performed on a radio access network, a core network, a transport network, and the like. A network slice of the radio access network, a network slice of the core network, and a network slice of the transport network are connected together, to constitute an overall network slice that can provide a complete service for a user. Commercial deployment of the 5G network system will be a long-term process of replacement, upgrade, and iteration based on a 4G system. Therefore, convergent 4G-5G networking can help ensure service continuity when 5G coverage is incomplete. Convergent 4G-5G networking means that networks, data, and services need to be converged and evolved. During evolution from the existing 4G network to the 5G network, convergence of subscriber subscription data, convergence of service policy data, and service continuity need to be first considered.

Figure 1A:
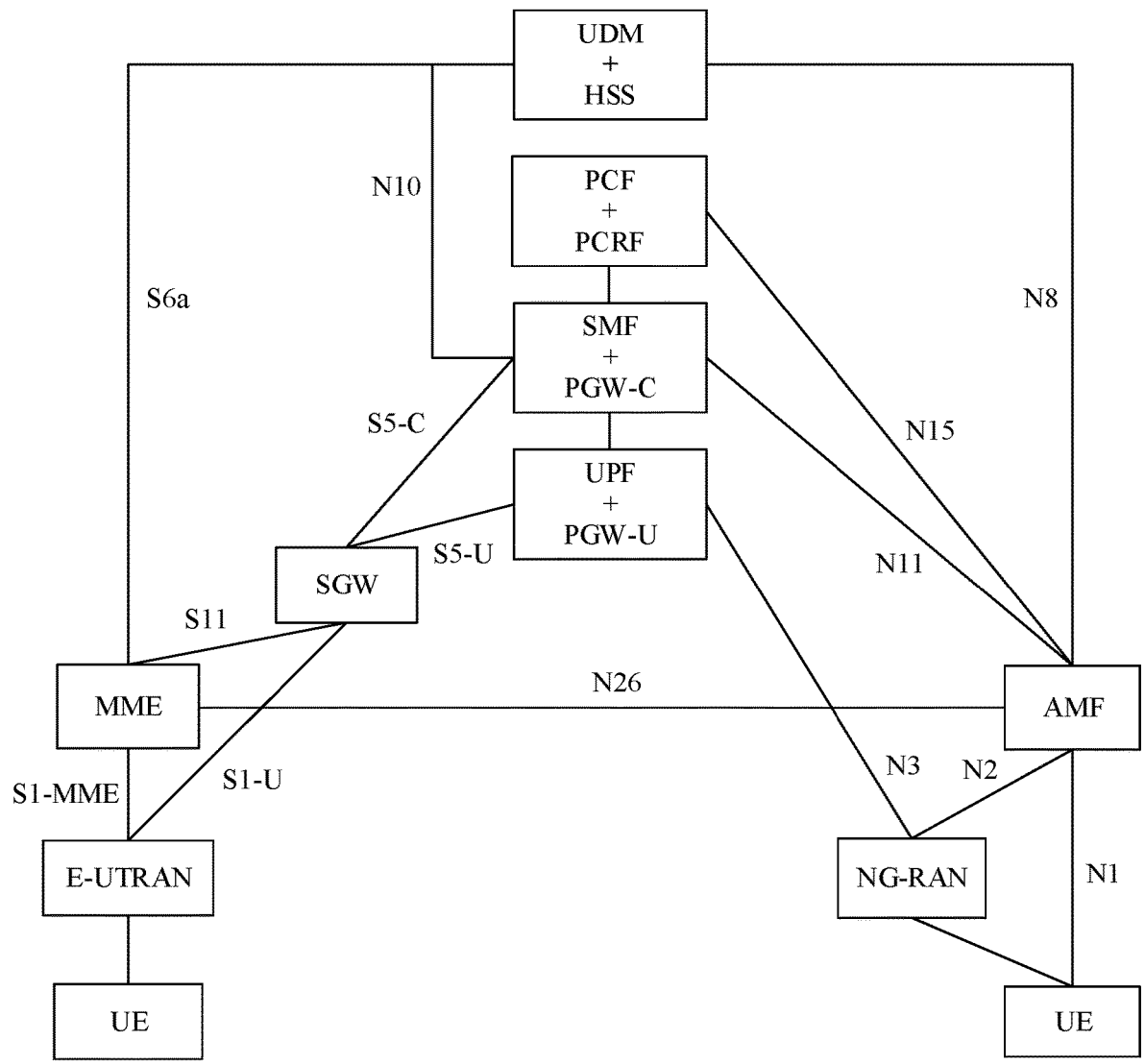
FIG. 1A is a schematic diagram of a 4G-5G interworking system architecture.

In view of the network evolution requirements, 3GPP defines convergent 4G-5G network elements dedicated to inter-RAT interoperations: user plane function+packet data gateway user plane function, session management function+packet data gateway control plane function, policy control function+policy and charging rules function, and unified data management function+home subscriber service function. A 4G-5G interworking system architecture is shown in FIG. 1A. In the embodiments of this application, the 5G network is considered as a first network, and the 4G network is considered as a second network. The user plane function (UPF) is a 5G user plane function. The packet data gateway user plane (PGW-U) function is a 4G gateway user plane function corresponding to the UPF. The session management function (SMF) is a 5G session management function. The packet data gateway control plane (PGW-C) function is a 4G gateway control plane function corresponding to the SMF. The policy control function (PCF) is a 5G policy control function. The policy and charging rules function (PCRF) is a corresponding 4G policy and charging rules function. The unified data management (UDM) function is a 5G function for storing user data (such as subscription data and authentication/authorization data). The home subscriber server (HSS) function is a corresponding 4G function for managing user subscription data and location information of mobile subscribers. In the foregoing interworking architecture, a first access management network element in the first network, for example, an access and mobility management function (AMF)), and a second access management network element in the second network, for example, a mobility management entity (MME), may communicate with each other through an N26 interface (if there is an interface between the two network elements in actual deployment). This interface is used for context transfer and handover of a terminal device. It can be understood that the interworking architecture shown in FIG. 1A may include a plurality of access management network elements, a plurality of access network devices, and a plurality of terminals. FIG. 1A is merely an example, and this is not limited in the embodiments.

Figure 1B:
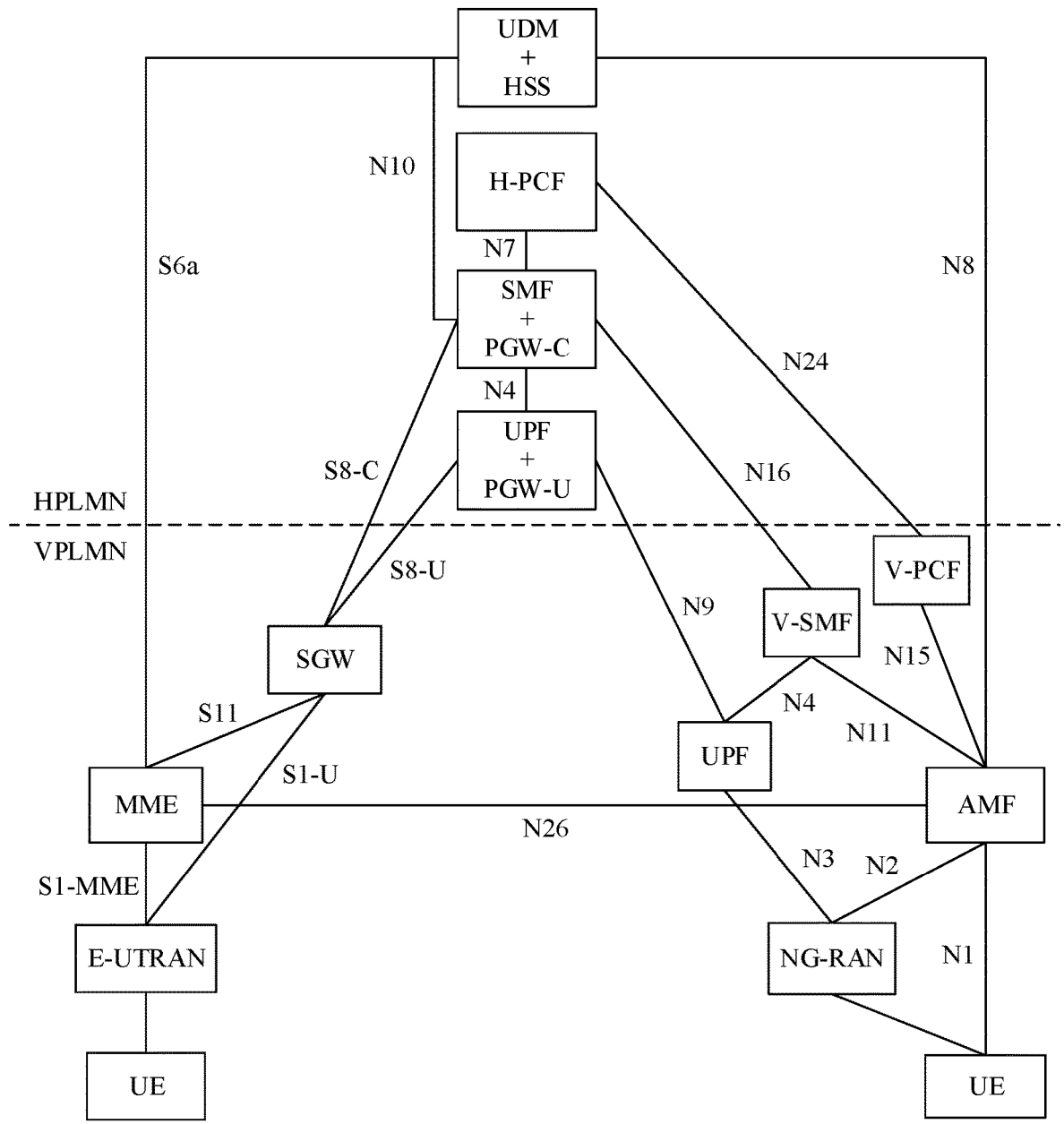
FIG. 1B is a schematic diagram of another 4G-5G interworking system architecture.

In an example, a 4G-5G interworking system architecture is shown in FIG. 1B. In comparison with the interworking architecture shown in FIG. 1A, FIG. 1B further describes the 4G-5G interworking system architecture based on a home routed roaming scenario. The interworking architecture shown in FIG. 1B includes a home public land mobile network (HPLMN) and a visited PLMN (VPLMN). In the interworking architecture, a session management network element includes a visited session management function (V-SMF) and a home session management function (H-SMF). In an interworking scenario, the H-SMF is SMF+PGW-C. A policy control function includes a visited policy control function (V-PCF) and a home policy control function (H-PCF). In the home routed roaming scenario, data traffic is terminated in the HPLMN.

The first network and/or the second network may include an access network, a core network, and a data network. Optionally, the first network and/or the second network may further include a terminal device. The terminal device is a device that has a wireless transceiver function. The terminal device may be deployed on land. For example, the terminal device is an indoor device, an outdoor device, a handheld device, a wearable device, or a vehicle-mounted device. Alternatively, the terminal device may be deployed on the water (for example, on a ship), or may be deployed in the air (for example, on a plane, a balloon, or a satellite). The terminal device may be a mobile phone, a tablet computer (Pad), a computer with a wireless transceiver function, a virtual reality (VR) terminal device, an augmented reality (AR) terminal device, a wireless terminal in industrial control, a vehicle-mounted terminal device, a wireless terminal in self driving, a wireless terminal in remote medical, a wireless terminal in smart grid, a wireless terminal in transportation safety, a wireless terminal in smart city, a wireless terminal in smart home, and a wearable terminal. The terminal device may be sometimes referred to as a terminal, user equipment (UE), an access terminal device, an in-vehicle terminal, a terminal in industrial control, a UE unit, a UE station, a mobile station, a mobile console, a remote station, a remote terminal device, a mobile device, a UE agent, a UE apparatus, or the like. The terminal device may be a fixed terminal device or a mobile terminal device. In FIG. 1A and/or FIG. 1B and the embodiments of this application, UE is used as an example of the terminal device for description.

The access network may be a radio access network (RAN). The access network may provide a network access function for an authorized user in a specific area, and can determine transmission tunnels of different quality based on user levels, service requirements, and the like, for user data transmission. The access network forwards control signals and user data between the terminal and the core network. The access network may include an access network device (or referred to as an access device). The access network device may be, for example, a base station (for example, an eNB) in an LTE system or a base station (for example, an NG-RAN) in a new radio (NR) system, an evolved base station in 3GPP, an access node in a Wi-Fi system, a wireless relay node, a wireless backhaul node, or the like. The base station may be a macro base station, a micro base station, a picocell base station, a small cell, a relay station, a balloon station, or the like.

The core network is responsible for maintaining subscription data of a mobile network, and provides functions such as session management, mobility management, access control, and information storage for UE. Session management includes management of bearers required for creating a session. A concept "EPS bearer" is introduced to an evolved packet system (EPS), to effectively improve user experience and reduce a service setup delay. The EPS bearer is logical aggregation of one or more service data flows between a packet data gateway and a terminal. The EPS bearer is used to provide QoS guarantee for transmission. There are two types of EPS bearers: default bearers and dedicated bearers. The default bearers are user bearers that satisfy data and signaling of default QoS. The dedicated bearers are bearers that are set up to provide specific QoS transmission requirements. In a PDN connection, there is only one default bearer, but there are a plurality of dedicated bearers. In 4G standards, a terminal may set up a maximum of 11 EPS bearers, and the terminal may set up a maximum of 8 EPS bearers due to air interface restrictions. Mobility management includes management of terminal attachment/detachment, tracking area update, UE handover, paging, and the like. Access control includes authentication and key agreement, so that a service requested by a user is available in a current network. Information storage may include storage of mobility management context information and EPS bearer context information, including user identities, tracking area information, authentication information, network element addresses, QoS parameters, and the like.

The data network (DN) is configured to provide services for users. The data network may be a private network, for example, a local area network. The data network may alternatively be an external network that is not controlled by carriers, for example, Internet. The data network may alternatively be a dedicated network jointly deployed by carriers, for example, a network that provides an IP multimedia subsystem (IMS).

In the first network, the terminal accesses the DN by creating a session (for example, a PDU session). One session may include a plurality of data flows (for example, QoS flows), and one session has only one tunnel. One session may include one default QoS flow (a QoS Flow associated with the default QoS rule). In the second network, the terminal accesses the DN by creating a connection (for example, a PDN connection). One connection may include a plurality of EPS bearers, and one EPS bearer corresponds to one tunnel. One PDN connection includes one default EPS bearer. In the interworking architecture shown in FIG. 1A and/or FIG. 1B, as a location of the terminal changes, the terminal may move from the first network to the second network. There is a mapping relationship between a QoS flow in the first network and an EPS bearer in the second network. For a quality of service flow (QoS flow) that is possibly handed over to the second network, the first access management network element in the first network allocates a corresponding EPS bearer identity (EBI) to the QoS flow. Similarly, the default QoS flow in the first network and the default EPS bearer in the second network have a similar function. The flow/bearer runs through a life cycle of an entire session/connection. When the flow/bearer is released, it means that the session/connection is also released.

As specified in the 4G standards, an MME supports a maximum of 11 bearers for any terminal that accesses the 4G network, and an EBI value ranges from 5 to 15 (11 bearers), as listed in Table 1. In 5G standards, considering that a quantity of EBIs may be insufficient, (four) EBIs 1 to 4 that are reserved in the 4G standards are extended to (15) EBIs 1 to 15. Although some MMEs in a live network that are upgraded can support 15 EBIs, MMEs that are not upgraded can still support only 11 EBIs. Especially in an inter-PLMN scenario, some MMEs in a PLMN are upgraded, but some MMEs in the PLMN are not upgraded.

TABLE 1

EBI values in 4G standards

| EBI bit value | EBI value | Notes |
|---|---|---|
| 0000 | 0 | Not defined |
| 0001 | 1 | Reserved |
| 0010 | 2 | Reserved |
| 0011 | 3 | Reserved |
| 0100 | 4 | Reserved |
| 0101 | 5 | Allocated |
| 0110 | 6 | Allocated |
| 0111 | 7 | Allocated |
| 1000 | 8 | Allocated |
| 1001 | 9 | Allocated |
| 1010 | 10 | Allocated |
| 1011 | 11 | Allocated |
| 1100 | 12 | Allocated |
| 1101 | 13 | Allocated |
| 1110 | 14 | Allocated |
| 1111 | 15 | Allocated |

In the interworking architecture shown in FIG. 1A and/or FIG. 1B, on one hand, the second access management network element (MME) in the second network may not be upgraded, and can support only 11 EBI values. When a PDU session created by the terminal in the first network is handed over to the second network, the first access management network element in the first network may detect more EBIs than EBIs that the second access management network element in the second network supports, or the first access management network element in the first network may detect an EBI (for example, EBI≤4) that the second access management network element in the second network does not support. When the first access management network element obtains session context information from the session management network element, because the session management network element does not know whether the second access management network element supports 11 EBI values or 15 EBI values, the session management network element cannot determine whether bearer context information that is fed back to the first access management network element should include a bearer with an EBI value ranging from 1 to 4. If the session management network element returns, by default, context information corresponding to EBI values ranging from 1 to 15, the first access management network element sends all the context information to the second access management network element. Because the second access management network element is not upgraded, when the second access management network element receives context information corresponding to a bearer corresponding to an EBI (for example, EBI≤4) that the second access management network element does not support, the second access management network element does not know how to deal with, a fault may occur, and a handover failure may be caused. On the other hand, when a session is created in the first network, a value ranging from 1 to 4 may be allocated to an EBI corresponding to a default QoS flow, that is, the allocated EBI corresponding to the default QoS flow is an EBI that the second access management network element, which is not upgraded, in the second network does not support. In this case, when the terminal moves from the first network to the second network, if the second access management network element does not support the EBI values 1 to 4, a session handover failure is caused all the time.

To resolve the foregoing problems, the embodiments of this application provide a communication method and apparatus. The communication method may be applied to an architecture for interworking between a first network and a second network. The communication method helps increase a success rate for a terminal to move from the first network to the second network.

Figure 2:
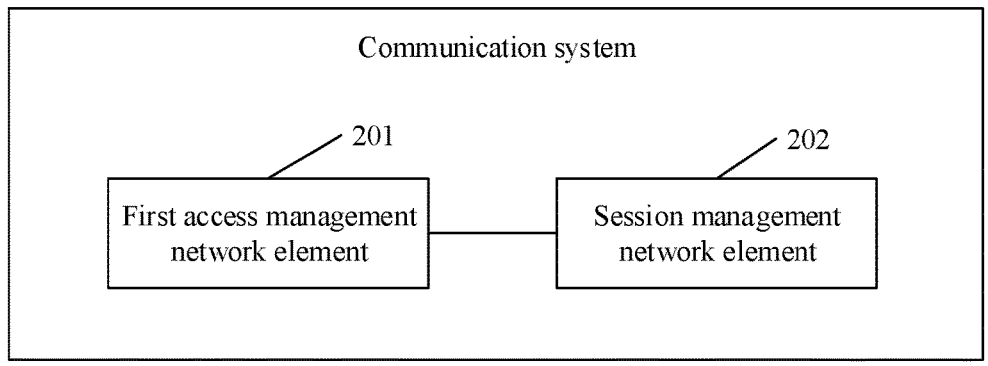
FIG. 2 is a schematic diagram of a communication system according to an embodiment of this application.

FIG. 2 shows a communication system according to an embodiment of this application. The communication system shown in FIG. 2 includes a first access management network element 201 and a session management network element 202. In an implementation, the first access management network element 201 sends indication information to the session management network element 202, so that the session management network element 202 feeds back only context information corresponding to a bearer that a second access management network element in a second network supports. This can increase a success rate for a terminal to move from the first network to the second network.

In another implementation, if the first access management network element 201 determines that the second access management network element in the second network does not support an extended EBI, the first access management network element 201 indicates the session management network element 202 to release the extended EBI. The session management network element 202 feeds back only the context information corresponding to the bearer that the second access management network element in the second network supports. This can increase the success rate for the terminal to move from the first network to the second network.

The following provides descriptions with reference to specific embodiments.

Figure 3:
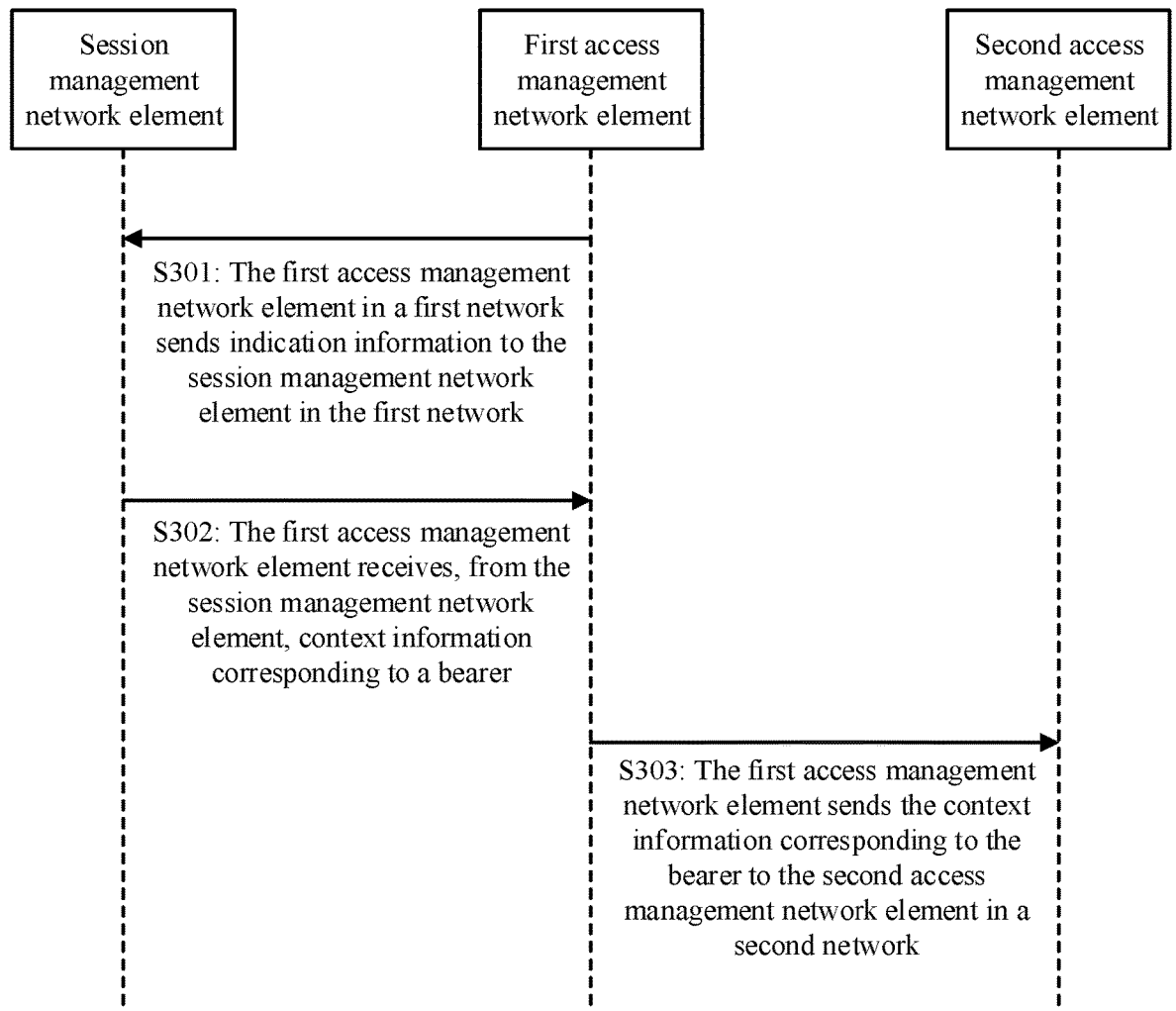
FIG. 3 is a schematic flowchart of a communication method according to an embodiment of this application.

An embodiment of this application provides a communication method. Refer to FIG. 3. The communication method can be implemented through interaction between a first access management network element, a session management network element, and a second access management network element. The communication method includes the following steps:

S301: The first access management network element in a first network sends indication information to the session management network element in the first network, where the indication information is used to indicate the session management network element to feed back context information corresponding to a bearer of a terminal in a second network. Correspondingly, the session management network element receives the indication information sent by the first access management network element. The bearer is a bearer that the second access management network element in the second network supports.

When the terminal moves from the first network to the second network, if the terminal has registered with the first network and created a session, the terminal needs to correspondingly set up an EPS bearer in the second network. The indication information is used to indicate the session management network element in the first network to feed back the context information corresponding to the bearer of the terminal in the second network. The bearer of the terminal in the second network is the bearer that the second access management network element in the second network supports. In this case, the indication information is used to indicate the session management network element to feed back only the context information corresponding to the bearer that the second access management network element supports. Alternatively, the session management network element receives the indication information sent by the first access management network element, and the session management network element does not feed back context information corresponding to a bearer corresponding to an EBI that the second access management network element does not support.

In an example, the indication information may be in a plurality of forms. For example, the indication information includes a quantity of bearers that the second access management network element supports or a bearer identity value that the second access management network element supports. For example, if the quantity of bearers that the second access management network element supports is 15, or in other words, if the bearer identity value that the second access management network element supports ranges from 1 to 15, it indicates that the second access management network element is upgraded, and the quantity of bearers that the second access management network element supports is the same as a quantity of bearers supported in the first network, that is, 15. For another example, if the quantity of bearers that the second access management network element supports is 11, or in other words, if the bearer identity value that the second access management network element supports ranges from 5 to 15, it indicates that the second access management network element is not upgraded, and the quantity of bearers that the second access management network element supports is different from the quantity of bearers supported in the first network. It should be noted that in this embodiment of this application, that the quantity of bearers that the second access management network element supports is 15 or that the bearer identity value that the second access management network element supports ranges from 1 to 15 may be considered to convey a same meaning. Either of the descriptions is used hereinafter, and details are not described again. It should be noted that the range of EBIs that the second access management network element supports in this embodiment of this application is merely an example. With evolution of 5G standards, the range of EBIs that an AMF and an MME may support may be further extended. This is not limited in this embodiment.

Optionally, the indication information includes that the quantity of bearers of the first network exceeds the quantity of bearers that the second access management network element supports. For example, the quantity of bearers that the second access management network element supports is 11. If a quantity of QoS flows corresponding to a created PDU session in the first network exceeds 11, the indication information includes that the quantity of bearers of the first network exceeds the quantity of bearers that the second access management network element supports, that is, it indicates that the second access management network element is not upgraded. Optionally, the indication information includes that the second access management network element does not support an extended bearer identity. For example, an EBI that the second access management network element supports ranges from 5 to 15. However, an extended EBI ranges from 1 to 15, and it indicates that the second access management network element does not support the extended EBI. It should be noted that a name or a form of the indication information is merely an example for description. This is not limited in this embodiment.

Optionally, the indication information includes a bearer identity of a first bearer, and the first bearer is a bearer that the second access management network element supports or does not support. For example, if the first bearer is a bearer that the second access management network element supports, a value of the bearer identity of the first bearer ranges from 5 to 15. For another example, if the first bearer is a bearer that the second access management network element does not support, a value of the bearer identity of the first bearer ranges from 1 to 4.

In an implementation, the indication information may be an extended EBI value range support indication (EEVRSI) indicating whether the second access management network element in the second network supports an extended bearer identity, or in other words, the indication information may be an indication indicating whether the second access management network element in the second network supports 15 EBIs. For example, if an EBI that the second access management network element in the second network supports ranges from 1 to 15, it indicates that the second access management network element supports the extended bearer identity. One bit (bit, 0/1) may be used to identify the indication information. 0 indicates that 15 EBIs are not supported, and 1 indicates that 15 EBIs are supported; or 0 indicates that 15 EBIs are supported, and 1 indicates that 15 EBIs are not supported. It should be noted that the foregoing representation manner of the indication information is merely an example, and a plurality of bits may be used to identify the indication information. This is not limited in this embodiment.

In an example, the indication information may be carried in a session context request message. For example, when the terminal moves from the first network to the second network, the first access management network element in the first network may obtain session context information by sending the session context request message to the session management network element in the first network. The indication information is carried in the session context request message, so that the session context information fed back by the session management network element includes only the context information corresponding to the bearer that the second access management network element supports.

Optionally, second indication information is carried in the session context request message. In addition to the indication information, the session context request message may further carry the second indication information. The second indication information is used to indicate the terminal to move from the first network to the second network, or indicate the terminal to be handed over from the first network to the second network. For example, the terminal has registered with the first network and created a session. If a location of the terminal changes during session creation, and the terminal leaves a coverage area of the first network or moves to a coverage area in which a signal strength of the second network is obviously stronger than a signal strength of the first network, the second indication information is used to indicate to the terminal to be handed over from the first network to the second network. For another example, the terminal has registered with the first network and created a session. If a location of the terminal changes after the terminal enters in an idle mode, the terminal leaves a coverage area of the first network or moves to a coverage area in which a signal strength of the second network is obviously stronger than a signal strength of the first network.

In an example, before the first access management network element sends the indication information to the session management network element, the first access management network element determines the indication information, where the indication information includes the bearer identity of the first bearer. The first bearer is a bearer that the second access management network element supports or does not support. For example, when the first bearer is a bearer that the second access management network element supports, the first access management network element may select, according to a configuration or a policy, N bearers from an EBI list corresponding to supported bearers. It should be noted that, in the 4G network, one terminal may set up a maximum of eight EPS bearers due to air interface restrictions or other factors. For example, assuming that the terminal supports a maximum of eight bearers, correspondingly, the MME determines that N may be less than or equal to 8.

The following uses an example in which the MME supports a maximum of N EBIs for description, where N may be less than or equal to 8. That the AMF selects not more than N EBIs from bearer identities with values ranging from 5 to 15 may include the following several scenarios. 1. In an implementation, assuming that values of bearer identities allocated by the AMF all range from 5 to 15, and a quantity of allocated bearer identities does not exceed N, the second access management network element supports all the allocated bearer identities, and the indication information includes all the allocated bearer identities. Optionally, assuming that values of bearer identities allocated by the AMF all range from 5 to 15, and a quantity of allocated bearer identities exceeds N, the second access management network element supports any N bearer identities of all the allocated bearer identities. It can be understood that the second access management network element may select N bearer identities (for example, if a value of N is 8, the second access management network element may select bearer identities whose EBI values range from 5 to 12) from all the allocated bearer identities (for example, bearer identities with EBI values ranging from 5 to 15). Specific N bearer identities that are selected are not limited in this embodiment. In this implementation, the indication information includes the any N bearer identities of all the allocated bearer identities. Optionally, in this implementation, when the first bearer is a bearer that the second access management network element does not support, the indication information includes bearer identities of all the allocated bearer identities excluding the any N bearer identities. For example, if the allocated bearer identities are 5 to 14, and EBIs corresponding to bearer identities 5 to 12 are selected as available/handover-supported bearer identities, bearer identities 13 and 14 are unavailable/handover-unsupported bearer identities, that is, the indication information includes the bearer identities with EBI values of 13 and 14.

In another implementation, it is assumed that a range of EBI values allocated by the AMF includes 1 to 4 in addition to 5 to 15, bearers corresponding to values ranging from 1 to 4 are not default EPS bearers, and a quantity of allocated bearer identities with EBIs values ranging from 5 to 15 does not exceed N. In this case, the indication information includes all the allocated bearer identities excluding the bearer identities with EBI values ranging from 1 to 4. In this implementation, when the first bearer is a bearer that the second access management network element does not support, the indication information includes the allocated bearer identities with EBI values ranging from 1 to 4. Optionally, it is assumed that a range of EBI values allocated by the AMF includes 1 to 4 in addition to 5 to 15, bearers corresponding to values ranging from 1 to 4 are not default EPS bearers, and a quantity of allocated bearer identities with EBIs values ranging from 5 to 15 exceeds N. In this case, the second access management network element supports any N bearer identities of the allocated bearer identities with EBI values ranging from 5 to 15. Specific N bearer identities that are selected are not limited in this embodiment. In this implementation, the indication information includes the any N bearer identities of the allocated bearer identities with EBI values ranging from 5 to 15. Optionally, in this implementation, when the first bearer is a bearer that the second access management network element does not support, the indication information includes bearer identities of all the allocated bearer identities excluding the any N bearer identities and includes the allocated bearer identities with EBI values ranging from 1 to 4. For example, if the allocated bearer identities are 5 to 14 and 2 to 4, and EBIs corresponding to (eight) bearer identities 5 to 12 are selected as available/handover-supported bearer identities, bearer identities 13 and 14 and 2 to 4 are unavailable/unsupported bearer identities, that is, the indication information includes the bearer identities with EBI values 13 and 14 and 2 to 4.

In another implementation, it is assumed that a range of EBI values allocated by the AMF includes 1 to 4 in addition to 5 to 15, bearers corresponding to values ranging from 1 to 4 are default EPS bearers/default QoS flows, and a quantity of allocated bearer identities with EBIs values ranging from 5 to 15 does not exceed N. In this case, an EBI corresponding to a default EPS bearer/default QoS flow and an EBI corresponding to a connection (PDN connection)/session (PDU session) associated with the default EPS bearer/default QoS flow need to be removed from EBI values included in the indication information. For example, if a bearer whose EBI value is equal to 2 is a default EPS bearer, and a session associated with the default EPS bearer further includes a bearer whose EBI value is equal to 6, the AMF needs to remove both the bearer whose EBI is equal to 6 and the bearer whose EBI is equal to 2, and the indication information includes a remaining bearer identity of the allocated bearer identities with EBI values ranging from 5 to 15 from which the EBI value of 6 is removed. Optionally, it is assumed that a range of EBI values allocated by the AMF includes 1 to 4 in addition to 5 to 15, bearers corresponding to values ranging from 1 to 4 are default EPS bearers/default QoS flows, and a quantity of allocated bearer identities with EBIs values ranging from 5 to 15 exceeds N. In this case, an EBI corresponding to a default EPS bearer/default QoS flow and an EBI corresponding to a connection/session associated with the default EPS bearer/default QoS flow need to be removed from EBI values included in the indication information. If there are not more than N allocated bearer identities after the EBIs are removed, the indication information includes bearer identities corresponding to EBI values ranging from 5 to 15 from which the EBI corresponding to the default EPS bearer/default QoS flow and the EBI corresponding to the connection/session associated with the default EPS bearer/default QoS flow are removed. If there are still more than N allocated bearer identities after the EBIs are removed, N bearer identities are selected from the more than N allocated bearer identities, and the indication information includes the N EBIs. Optionally, when the first bearer is a bearer that the second access management network element does not support, the indication information includes the EBI corresponding to the default EPS bearer/default QoS flow and the EBI corresponding to the connection/session associated with the default EPS bearer/default QoS flow in the allocated EBIs with values ranging from 1 to 4. For example, if a bearer whose EBI is equal to 2 is a default EPS bearer, and a session associated with the default EPS bearer further includes a bearer whose EBI is equal to 6, values of the allocated EBIs range from 5 to 12, and values of EBIs included in the indication information include 2 and 6.

Optionally, before the first access management network element sends the indication information to the session management network element in the first network, the first access management network element determines the second access management network element. Optionally, before the first access management network element sends the indication information to the session management network element in the first network, the first access management network element determines the quantity of bearers that the second access management network element supports. Optionally, before the first access management network element sends the indication information to the session management network element in the first network, the first access management network element determines a range of bearer identities that the second access management network element supports. Optionally, whether the second access management network element supports the EEVRSI is a capability of the second access management network element, namely, an MME capacity. The first access management network element may send the MME capacity (for example, the EEVRSI) or a subset of the MME capacity to the session management network element in the first network. It can be understood that, in the foregoing four manners, the first access management network element determines related information of the second access management network element, and further determines the indication information to indicate the session management network element to feed back the context information corresponding to the bearer of the terminal in the second network.

S302: The first access management network element receives, from the session management network element, the context information corresponding to the bearer. Correspondingly, the session management network element sends the context information corresponding to the bearer to the first access management network element.

After receiving the indication information, the session management network element may reply, based on the indication information, to the context information corresponding to the bearer. Specifically, if the indication information indicates that the second access management network element in the second network does not support 15 EBIs (or in other words, that the second access management network element in the second network does not support the extended bearer identity, where the two kinds of descriptions convey a same meaning), the session management network element feeds back, based on the indication information, only the context information corresponding to the bearer of the terminal in the second network. The context information corresponding to the bearer includes the bearer context. Context information corresponding to an EPS bearer that the terminal supports in the second network includes bearer context information corresponding to the EPS bearer. The bearer context information is used to indicate a related parameter required for bearer setup, so as to ensure normal transmission of one or more service data flows between a PDN-GW and UE. The bearer context information may include but is not limited to a PDN GW address for a user plane, a PDN GW TEID of the user plane, a PDN GW TEID of a control plane (PDN GW TEID of the control plane), a PDN type (PDN Type), a PDN address, an EPS bearer identity, an EPS bearer QoS, and the like. The context information corresponding to the bearer is used to indicate the terminal to move from the first network to the second network. It should be noted that a name or a form of the bearer context information is merely an example for description. This is not limited in this embodiment.

Optionally, when the indication information includes the bearer identity of the first bearer, the first access management network element receives context information corresponding to the first bearer. The following uses an example in which the MME supports a maximum of N EBIs for description, where N may be less than or equal to 8. When the first bearer is a bearer that the second access management network element supports, in an implementation, assuming that values of EBIs allocated by the AMF all fall within 5 to 15, and a quantity of allocated bearer identities does not exceed N, the first access management network element receives context information corresponding to bearer identities that the second access management network element has allocated. Optionally, assuming that values of EBIs allocated by the AMF all fall within 5 to 15, and a quantity of allocated bearer identities exceeds N, the first bearer includes any eight bearer identities of allocated bearer identities. In this implementation, if the indication information includes the any eight bearer identities of the allocated bearer identities, the first access management network element receives context information corresponding to the any eight bearer identities of the allocated bearer identities. Optionally, in this implementation, when the first bearer is a bearer that the second access management network element does not support, the indication information includes bearer identities of all the allocated bearer identities excluding the any N bearer identities. For example, if the allocated bearer identities are 5 to 14, and EBIs corresponding to bearer identities 5 to 12 are selected as available/handover-supported bearers, bearers corresponding to bearer identities 13 and 14 are unavailable/handover-unsupported bearers, that is, the indication information includes the bearer identities with EBI values of 13 and 14. Correspondingly, the first access management network element receives context information corresponding to the bearer identities with EBI values of 13 and 14. Optionally, the first access management network element receives context information corresponding to the bearer identities with EBI values of 5 to 12.

In another implementation, it is assumed that the second access management network element supports EBI values ranging from 1 to 4 in addition to EBI values ranging from 5 to 15, EBIs with the values ranging from 1 to 4 are not default EPS bearers, and there are not more than N allocated bearer identities with EBI values ranging from 5 to 15. In this case, the first access management network element receives context information corresponding to all the bearers with EBI values other than the EBI values ranging from 1 to 4. In this implementation, when the first bearer is a bearer that the second access management network element does not support, the indication information includes the allocated bearer identities with EBI values ranging from 1 to 4. Correspondingly, the first access management network element receives context information corresponding to bearer identities with EBI values ranging from 1 to 4. Optionally, the first access management network element receives context information corresponding to all the allocated bearer identities with EBI values other than the EBI values ranging from 1 to 4. Optionally, it is assumed that the second access management network element supports the EBI values ranging from 1 to 4 in addition to the EBI values ranging from 5 to 15, EBIs with the values ranging from 1 to 4 are not default EPS bearers, and there are not more than N allocated bearer identities with EBI values ranging from 5 to 15, the second access management network element supports any N bearer identities of the allocated bearer identities with EBI values ranging from 5 to 15. Correspondingly, the first access management network element receives context information corresponding to any N bearer identities of the allocated bearer identities with EBI values other than the EBI values ranging from 1 to 4. Optionally, the first access management network element receives context information corresponding to bearer identities with EBI values ranging from 5 to 12. Optionally, in this implementation, when the first bearer is a bearer that the second access management network element does not support, the indication information includes bearer identities of all the allocated bearer identities excluding the any N bearer identities and includes the allocated bearer identities with EBI values ranging from 1 to 4. For example, if the allocated bearer identities are 5 to 14 and 2 to 4, and EBIs corresponding to (eight) bearer identities 5 to 12 are selected as available/handover-supported bearer identities, bearer identities 13 and 14 and 2 to 4 are unavailable/unsupported bearer identities, that is, the indication information includes the bearer identities with EBI values of 13 and 14 and 2 to 4. Correspondingly, the first access management network element receives context information corresponding to the bearer identities with EBI values of 13 and 14 and context information corresponding to bearer identities with EBI values of 2 to 4.

In another implementation, it is assumed that a range of EBI values allocated by the second access management network element includes 1 to 4 in addition to 5 to 15, bearers corresponding to values ranging from 1 to 4 are default EPS bearers/default QoS flows, and a quantity of allocated bearer identities with EBIs values ranging from 5 to 15 does not exceed N. In this case, an EBI corresponding to a default EPS bearer/default QoS flow and an EBI corresponding to a connection/session associated with the default EPS bearer/default QoS flow need to be removed from EBI values included in the indication information. For example, if a bearer whose EBI is equal to 2 is a default EPS bearer, and a session associated with the default EPS bearer further includes a bearer whose EBI is equal to 6, the AMF needs to remove both the bearer whose EBI is equal to 6 and the bearer whose EBI is equal to 2, the indication information includes a remaining allocated bearer identity of the allocated bearer identities with EBI values ranging from 5 to 15 from which the EBI is 6 is removed. Correspondingly, the first access management network element receives context information corresponding to the remaining allocated bearer identity of the allocated bearer identities with EBI values ranging from 5 to 15 from which the EBI is 6 is removed. Optionally, it is assumed that a range of EBI values allocated by the AMF includes 1 to 4 in addition to 5 to 15, bearers corresponding to values ranging from 1 to 4 are default EPS bearers/default QoS flows, and a quantity of allocated bearer identities with EBIs values ranging from 5 to 15 exceeds N. In this case, an EBI corresponding to a default EPS bearer/default QoS flow and an EBI corresponding to a connection/session associated with the default EPS bearer/default QoS flow need to be removed from EBI values included in the indication information. If there are not more than N allocated bearer identities after the EBIs are removed, the indication information includes bearer identities corresponding to EBI values 5 to 15 from which the EBI corresponding to the default EPS bearer/default QoS flow and the EBI corresponding to the connection/session associated with the default EPS bearer/default QoS flow are removed. Correspondingly, the first access management network element receives context information corresponding to the bearer identities obtained by removing the EBI corresponding to the default EPS bearer/default QoS flow and the EBI corresponding to the connection/session associated with the default EPS bearer/default QoS flow from the EBI values ranging from 5 to 15. Optionally, when the first bearer is a bearer that the second access management network element does not support, assuming that a range of EBI values allocated by the AMF include 1 to 4 in addition to 5 to 15, and bearers corresponding to values ranging from 1 to 4 are default EPS bearers/default QoS flows, the indication information includes an EBI, in the allocated EBIs with values ranging from 1 to 4, corresponding to a default EPS bearer/default QoS flow, and the EBI corresponding to a connection/session associated with the default EPS bearer/default QoS flow. For example, if a bearer whose EBI is equal to 2 is a default EPS bearer, and a session associated with the default EPS bearer further includes a bearer whose EBI is equal to 6, values of the allocated EBIs range from 5 to 12, and values of EBIs included in the indication information include 2 and 6. Correspondingly, the first access management network element receives context information corresponding to bearer identities with EBI values of 2 and 6. Optionally, the first access management network element receives context information corresponding to bearer identities with EBI values of 5 and 7 to 12.

In an example, if an EBI corresponding to the default QoS flow in the first network is one of EBIs with values ranging from 1 to 4, a session context reply message sent by the session management network element to the first access management network element may carry a failure indication/cause value. The failure indication/cause value is used to indicate that a session cannot be handed over to the second network; the failure indication/cause value indicates a session handover failure; the failure indication/cause value may be that a value of an EBI corresponding to a default QoS flow ranges from 1 to 4 but a target MME may do not support the EBI ranging from 1 to 4; or the failure indication/cause value may be that a value of an EBI corresponding to a default QoS flow ranges from 1 to 4 but a target MME does not support an extended EBI. It can be understood that the failure indication/cause value may be described in the foregoing four forms or descriptions, or may be described in another form or description. This is not limited in this embodiment. Optionally, if the EBI corresponding to the default QoS flow in the first network is one of the EBIs with values ranging from 1 to 4, the session management network element does not reply to the session context request message sent by the first access management network element, or the session management network element replies to the first access management network element with empty session context. This is not limited in this embodiment.

Optionally, before the session management network element sends the failure indication/cause value to the first access management network element, the method further includes: the session management network element determines, based on the second indication information or in another manner, that the first access management network element updates the session context to indicate a session to be handed over from the first network to the second network. If the first access management network element receives the failure indication/cause value sent by the session management network element, the first access management network element determines that handover fails, and may notify the second access management network element in the second network that the handover fails. Subsequent switchover steps may not be performed. It should be noted that the second indication information in this embodiment of this application may be sent by the first access management network element to the session management network element, and may be used to indicate the UE to be handed over from the first network to the second network, that is, the second indication information includes that the session is indicated to be handed over from the first network to the second network.

S303: The first access management network element sends the context information corresponding to the bearer to the second access management network element in the second network. Correspondingly, the second access management network element receives the context information corresponding to the bearer from the first access management network element.

After receiving the context information corresponding to the bearer, the first access management network element may send the context information corresponding to the bearer to the second access management network element in the second network, so that the second access management network element performs a corresponding step. Optionally, after receiving the context information corresponding to the bearer from the first access management network element, the second access management network element may select an SGW to create a session, and allocate tunnel information of the SGW. The context information includes the tunnel information. The tunnel information may include but is not limited to the PDN GW address for the user plane, the PDN GW TEID of the user plane, the PDN GW TEID of the control plane, and the like.

This embodiment of this application provides the communication method. The method can be implemented through interaction between the first access management network element, the session management network element, and the second access management network element. After receiving the indication information from the first access management network element, the session management network element feeds back only the context information corresponding to the bearer that the second access management network element supports. According to the communication method, the second access management network element does not receive the context information corresponding to the bearer that the second access management network element does not support. This can avoid a fault caused because the second access management network element receives the context information corresponding to the bearer that the second access management network element does not support, and can increase a success rate for the terminal to move from the first network to the second network.

Figure 4:
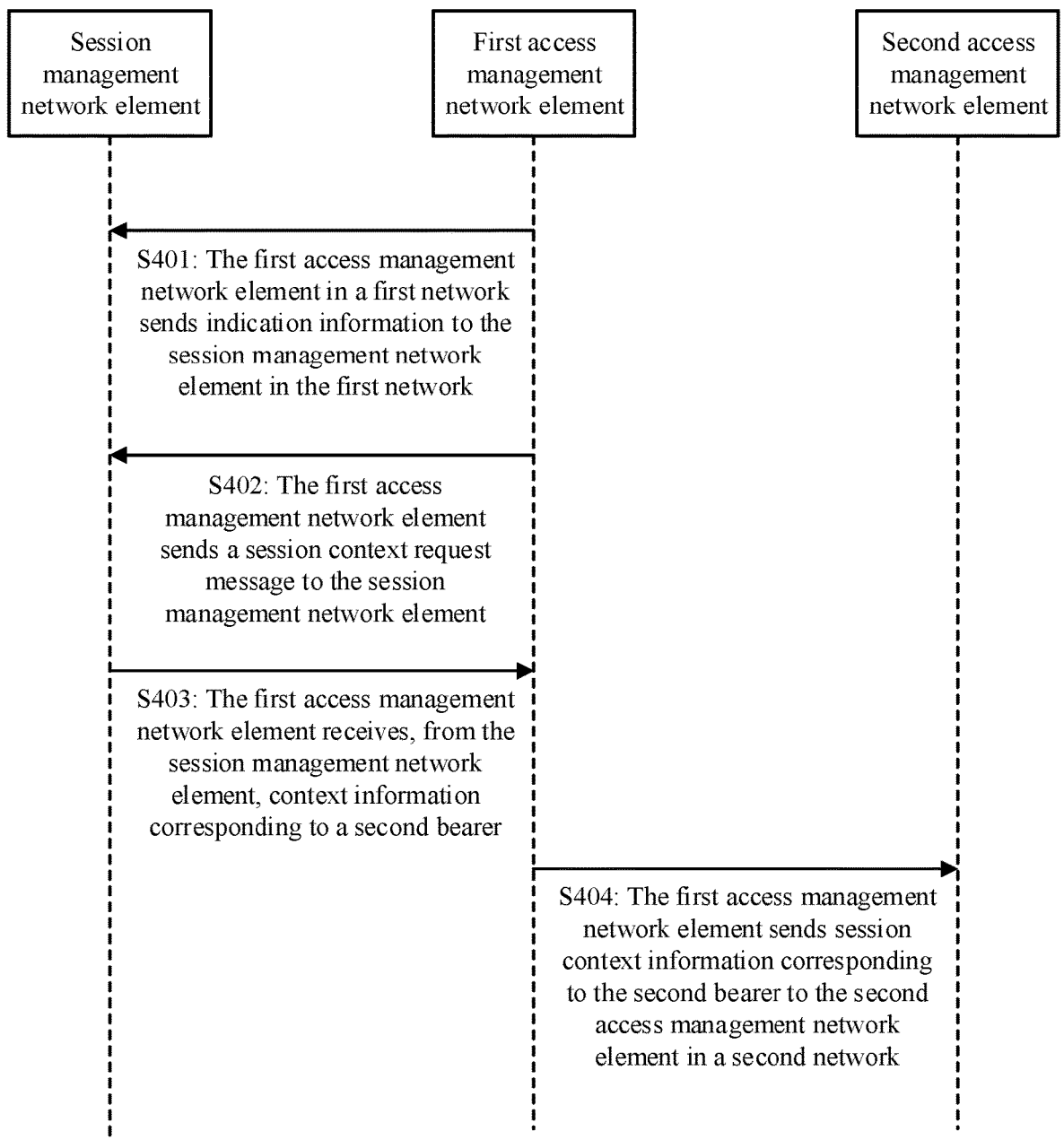
FIG. 4 is a schematic flowchart of a communication method according to an embodiment of this application.

An embodiment of this application provides a communication method. Refer to FIG. 4. The communication method can be implemented through interaction between a first access management network element, a session management network element, and a second access management network element. The communication method includes the following steps.

S401: The first access management network element in a first network sends indication information to the session management network element in the first network, where the indication information is used to indicate the session management network element to release context information corresponding to a first bearer of a terminal in a second network. Correspondingly, the session management network element in the first network receives the indication information sent by the first access management network element in the first network.

If the first access management network element in the first network determines that the second access management network element in the second network is not upgraded, that is, if the second access management network element does not support extended bearer identities (EBIs values are 1 to 4), before the first access management network element sends a session context request message to the session management network element in the first network, the first access management network element may send the indication information to the session management network element. The indication information is used to indicate the session management network element to release the context information corresponding to the first bearer of the terminal in the second network, and the first bearer is a bearer that the second access management network element does not support. For example, because the second access management network element in the second network is not upgraded, the first access management network element determines that a value of an EBI that the second access management network element supports ranges from 5 to 15. Correspondingly, a value of an EBI of a bearer that the second access management network element does not support ranges from 1 to 4. The indication information is used to indicate the session management network element to release bearer context whose EBI≤4.

Optionally, the indication information includes that the second access management network element in the second network does not support an extended bearer identity. For example, the second access management network element does not support an extended bearer identity, in other words, the second access management network element does not support bearer context whose EBI≤4. In this case, the indication information may include a value of an EBI of a bearer or a list of EBIs of bearers that the second access management network element does not support.

Optionally, the indication information is carried in a session context update request message. For example, if the first access management network element determines that the second access management network element is not upgraded, the first access management network element may send the session context update request message to the session management network element. The session context update request message carries the indication information, and the indication information is used to indicate the session management network element to release the bearer context whose EBI<4. After receiving the session context update request message, the session management network element releases, based on the indication information, the bearer context identified by the EBI<4. After the session management network element updates session context based on the indication information, updated session context includes bearer context information, and the bearer context information includes bearer context whose EBI>4 only.

Optionally, second indication information is carried in the session context update request message. In addition to the indication information, the session context update request message may further carry the second indication information. The second indication information is used to indicate the terminal to move from the first network to the second network, or indicate the terminal to be handed over from the first network to the second network. For an example of the second indication information, refer to the example of the second indication information in the embodiment shown in FIG. 3. Details are not described herein again.

Optionally, before the first access management network element sends the indication information to the session management network element, the first access management network element determines the indication information, where the indication information includes a bearer identity of the first bearer. The first bearer is a bearer that the second access management network element does not support. In an implementation, assuming that a range of EBI values allocated by an AMF includes 1 to 4 in addition to 5 to 15, and bearers corresponding to values ranging from 1 to 4 are not default EPS bearers, the indication information includes bearer identities corresponding to EBI values ranging from 1 to 4. In another implementation, assuming that a range of EBI values allocated by an AMF includes 1 to 4 in addition to 5 to 15, and bearers corresponding to values ranging from 1 to 4 are default EPS bearers/default QoS flows, values of EBIs included in the indication information include an EBI corresponding to a default EPS bearer/default QoS flow, and an EBI corresponding to a connection/session associated with the default EPS bearer/default QoS flow. For example, if a bearer whose EBI is equal to 2 is a default EPS bearer, and a session associated with the default EPS bearer further includes a bearer whose EBI is equal to 6, values of EBIs included in the indication information include 1 to 4 and 6.

Optionally, before the first access management network element sends the indication information to the session management network element in the first network, the first access management network element determines the second access management network element. Optionally, before the first access management network element sends the indication information to the session management network element in the first network, the first access management network element determines a quantity of bearers that the second access management network element supports. Optionally, before the first access management network element sends the indication information to the session management network element in the first network, the first access management network element determines a range of bearer identities that the second access management network element supports. It can be understood that, in the foregoing three manners, the first access management network element determines related information of the second access management network element, and further determines the indication information to indicate the session management network element to feed back the context information corresponding to the bearer of the terminal in the second network.

Optionally, the session management network element determines to release the bearer context whose EBI≤4, but one of EBIs≤4 corresponds to a default QoS flow in the first network. A session context reply message that is sent by the session management network element to the first access management network element may carry a failure indication/cause value. The failure indication/cause value is used to indicate that a session cannot be handed over to the second network; the failure indication/cause value indicates a session handover failure; the failure indication/cause value may be that a value of an EBI corresponding to a default QoS flow ranges from 1 to 4 but a target MME may do not support the EBI ranging from 1 to 4; or the failure indication/cause value may be that a value of an EBI corresponding to a default QoS flow ranges from 1 to 4 but a target MME does not support an extended EBI. It can be understood that the failure indication/cause value may be described in the foregoing four forms or descriptions, or may be described in another form or description. This is not limited in this embodiment. Optionally, if the EBI corresponding to the default QoS flow in the first network is one of EBIs with values ranging from 1 to 4, the session management network element does not reply to the session context request message sent by the first access management network element, or the session management network element replies to the first access management network element with empty session context. This is not limited in this embodiment.

Optionally, before the session management network element sends the failure indication/cause value to the first access management network element, the method further includes: the session management network element determines, based on the second indication information or in another manner, that the first access management network element updates the session context to indicate a session to be handed over from the first network to the second network. If the first access management network element receives the failure indication/cause value sent by the session management network element, the first access management network element determines that handover fails, and may notify the second access management network element in the second network that the handover fails. Therefore, subsequent handover steps may not be performed.

S402: The first access management network element sends the session context request message to the session management network element. Correspondingly, the session management network element receives the session context request message sent by the first access management network element.

S403: The first access management network element receives, from the session management network element, context information corresponding to a second bearer, where the second bearer is a bearer that the second access management network element supports. Correspondingly, the session management network element sends the context information corresponding to the second bearer to the first access management network element. When the terminal moves from the first network to the second network, if the terminal has registered with the first network and created a session, the terminal needs to correspondingly set up an EPS bearer in the second network. For example, after the session management network element releases, based on the indication information, the bearer context whose EBI≤4, updated bearer context information includes bearer context whose EBI>4 only. The bearer context information requested by the session context request message that the first access management network element sends to the session management network element also includes the bearer context whose EBI>4 only. The session management network element may feed back, to the first access management network element based on the session context request message, the context information corresponding to the second bearer, where the context information corresponding to the second bearer includes context information corresponding to a bearer that the second access management network element supports. For example, if the session management network element has released the bearer context whose EBI≤4, the updated bearer context information includes the bearer context whose EBI>4 only, in other words, the updated bearer context includes only context corresponding to the bearer that the second access management network element supports. The first access management network element receives the context information that corresponds to the second bearer and that is fed back by the session management network element, that is, the first access management network element receives only the context information that corresponds to the bearer that the second access management network element supports and that is fed back by the session management network element.

S404: The first access management network element sends session context information corresponding to the second bearer to the second access management network element in the second network. Correspondingly, the second access management network element receives the session context information corresponding to the second bearer from the first access management network element.

After receiving the context information that corresponds to the second bearer and that is fed back by the session management network element, the first access management network element may send the session context information corresponding to the second bearer to the second access management network element, to ensure that the second access management network element receives no session context information corresponding to a bearer that the second access management network element does not support. The session context information corresponding to the second bearer for moving the terminal from the first network to the second network. Optionally, after receiving the context information corresponding to the second bearer from the first access management network element, the second access management network element may select an SGW to create a session, and allocate tunnel information of the SGW. The context information includes the tunnel information.

This embodiment of this application provides the communication method. The method can be implemented through interaction between the first access management network element, the session management network element, and the second access management network element. After receiving the indication information from the first access management network element, the session management network element in the communication method releases the context information corresponding to the bearer that the second access management network element does not support. In this case, the session management network element feeds back, to the first access management network element, only the context information corresponding to the bearer that the second access management network element supports. According to the communication method, the second access management network element does not receive the context information corresponding to the bearer that the second access management network element does not support. This can avoid a fault caused because the second access management network element receives the context information corresponding to the bearer that the second access management network element does not support, and can increase a success rate for the terminal to move from the first network to the second network.

The following describes in detail scenarios of the communication method described in the embodiments of this application. In the following embodiments, for example, a first network is a 5G network, a second network is a 4G network, a first access management network element is an AMF, a second access management network element is an MME, a session management network element is a PGW-C+SMF, a user plane network element is a UPF+PGW-U, a first access network device is an NG-RAN, a second access network device is an eNB, a serving gateway is an SGW, and a terminal is UE.

For example, in a scenario 1, the UE has registered with the 5G network and created a session. A location of the UE changes when the session is being held. For example, the UE leaves a coverage area of the 5G network or moves to a coverage area in which a signal strength of the 4G network is obviously stronger than a signal strength of the 5G network.

Figure 5:
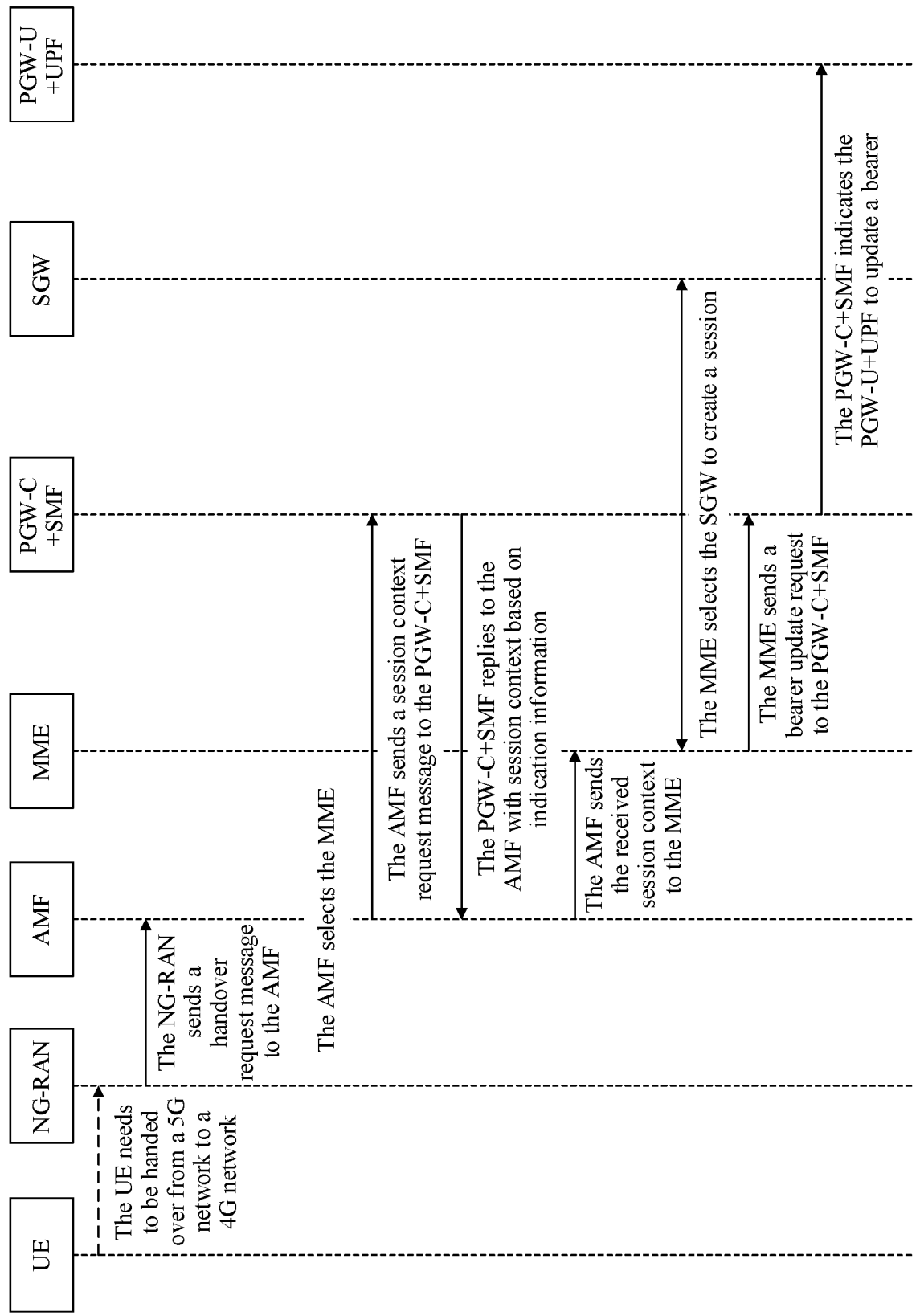
FIG. 5 is a schematic flowchart of a communication method applied to a scenario 1 according to an embodiment of this application.

Refer to FIG. 5. When the communication method in the embodiment in FIG. 3 is applied to the foregoing scenario 1, an implementation procedure may include the following steps.

1. The NG-RAN determines that the UE needs to be handed over to an E-UTRAN, and the NG-RAN sends a handover request message to the AMF. The handover request message is used to request for handover from the 5G network to the 4G network.
2. The AMF selects the MME. After determining the corresponding MME, the AMF may correspondingly determine an MME capacity. For example, the AMF determines whether the MME supports an extended EBI value, or in other words, the AMF determines whether the MME supports 15 EPS bearers. An EEVRSI may be used to indicate the MME capacity.
3. The AMF sends a session context request message to the PGW-C+SMF, where the session context request message carries indication information. The indication information is used to indicate the PGW-C+SMF to feed back, to the AMF, only session context whose EBI value>4. The indication information may be a quantity of EBIs that the MME supports (for example, the indication information indicates whether the MME supports 15 EBIs or the indication information indicates that the MME supports only 11 EBIs). Alternatively, the indication information includes that a quantity of EBIs to be handed over to the PGW-C+SMF exceeds a quantity of EBIs that the MME supports. Alternatively, the indication information may include bearer context whose EBI<4 that the MME does not support. Alternatively, the indication information may be that whether the MME supports the extended EBI value described in step 2. The indication information may be an attribute in the MME capacity. This is not limited in this embodiment. Specifically, in this embodiment, the indication information may be that the MME does not support 15 EBIs, or the indication information may be that the MME does not support an extended EBI, that is, the EEVRSI indicates "no". It should be noted that, in a home-routed roaming scenario, that the AMF requests session context from the PGW-C+SMF in step 3 in FIG. 5 should be understood as that the AMF requests the session context from a V-SMF instead of the PGW-C+SMF. In addition, the V-SMF may further notify the PGW-G+SMF of the indication information, and subsequently the PGW-C+SMF may release the session or the session context based on the indication information. Optionally, the session context request message may further carry second indication information, and the second indication information is used to indicate the UE to be handed over from the 5G network to the 4G network, or the second indication information is used to indicate the session to be handed over from the 5G network to the 4G network.

4. The PGW-C+SMF replies to the AMF with the session context based on the indication information. If the indication information indicates that the MME does not support 15 EBIs, or in other words, if the indication information indicates that the MME does not support an extended EBI value, the session context includes only bearer context whose EBI>4. Optionally, if the PGW-C+SMF or the V-SMF determines, based on the second indication or in another manner, that the AMF obtains the session context to indicate the UE to move from the 5G network to the 4G network or indicate the UE to be handed over from the 5G network to the 4G network, and an EBI corresponding to a default QoS flow is any one of EBIs 1 to 4, the PGW-C+SMF or the V-SMF does not reply to the AMF with the session context or replies to the AMF with empty session context. Optionally, the PGW-C+SMF or the V-SMF may send a failure indication/cause value to the AMF, where the failure indication/cause value is used to indicate that the session cannot be handed over to the 4G network or the session handover fails. Alternatively, the failure indication/cause value may be that a value of an EBI corresponding to a default QoS flow ranges from 1 to 4 but a target MME may do not support the EBI ranging from 1 to 4, or the failure indication/cause value may be that a value of an EBI corresponding to a default QoS flow ranges from 1 to 4 but a target MME does not support an extended EBI.

5. The AMF sends the received session context to the MME. Optionally, if the AMF receives the failure indication/cause value sent by the PGW-C+SMF or the V-SMF, receives no session context replied by the PGW-C+SMF or the V-SMF, or receives the empty session context replied by the PGW-C+SMF or the V-SMF, the AMF determines that handover fails. The AMF may notify the MME of the handover failure, and may not perform subsequent handover steps.

6. The MME selects an SGW to create a session, sends tunnel information (the information is included in the session context) of the PGW-U+UPF to the SGW, and allocates the tunnel information of the SGW.

7. The MME sends a bearer update request to the PGW-C+SMF, and sends the tunnel information of the SGW to the PGW-C+SMF.

8. The PGW-C+SMF indicates the PGW-U+UPF to update a bearer.

Optionally, before step 1, the UE has registered with the 5G network and created the session. That the UE has created the session in the 5G network may include that the UE has established a tunnel between the NG-RAN and the PGW-U+UPF. For details, refer to steps in which the UE registers with the 5G network and creates a session specified in the standard document TS23.501 of the standardization organization (3GPP). Details are not described herein.

Optionally, after step 8, the implementation procedure may further include a subsequent handover procedure. For example, the implementation procedure further includes procedures such as radio resource configuration and establishment of a user plane tunnel from the eNB to the SGW. For details, refer to corresponding steps specified in the standard document TS23.501 of the standardization organization (3GPP). Details are not described herein.

Figure 6:
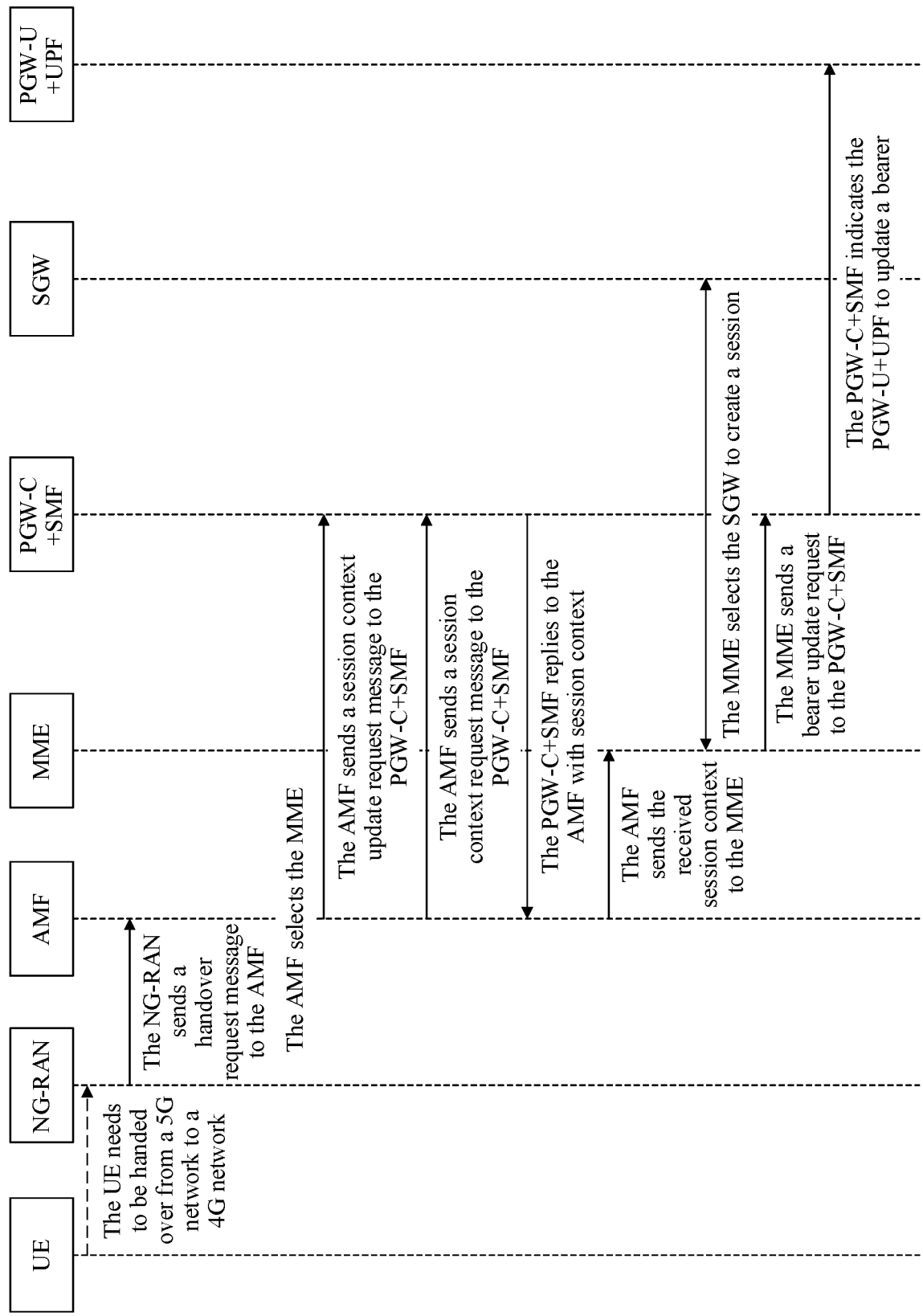
FIG. 6 is a schematic flowchart of a communication method applied to a scenario 1 according to an embodiment of this application.

Refer to FIG. 6. When the communication method in the embodiment in FIG. 4 is applied to the foregoing scenario 1, an implementation procedure may include the following steps.

1. The NG-RAN determines that the UE needs to be handed over to an E-UTRAN, and the NG-RAN sends a handover request message to the AMF. The handover request message is used to request for handover from the 5G network to the 4G network.

2. The AMF selects the MME. After determining the corresponding MME, the AMF may correspondingly determine an MME capacity. For a specific determining manner, refer to step 2 in the example shown in FIG. 5. Details are not described herein again.

3. If the AMF determines that a value of an EBI that the MME supports ranges from 5 to 15, the AMF sends a session context update request message to the PGW-C+SMF, where the session context update request message carries the indication information. The indication information is used to indicate the PGW-C+SMF to release bearer context whose EBI<5. The indication information includes a released EBI list. In addition to the indication information, the session context update request message may further carry second indication information, and the second indication information is used to indicate the UE to be handed over from the 5G network to the 4G network, or the second indication information is used to indicate a session to be handed over from the 5G network to the 4G network. Optionally, if the PGW-C+SMF or the V-SMF determines that an EBI corresponding to a default QoS flow is one of EBIs 1 to 4, the PGW-C+SMF or the V-SMF may send a failure indication/cause value to the AMF, where the failure indication/cause value is used to indicate that the session cannot be handed over to the 4G network or session handover fails. Alternatively, the failure indication/cause value may be that a value of an EBI corresponding to a default QoS flow ranges from 1 to 4 but a target MME may do not support the EBI ranging from 1 to 4, or the failure indication/cause value may be that a value of an EBI corresponding to a default QoS flow ranges from 1 to 4 but the target MME does not support an extended EBI. Optionally, before the SMF sends the failure indication/cause value to the AMF, the method further includes: The SMF determines, based on the second indication or in another manner, that the AMF updates session context to indicate the session to be handed over from the 5G network to the 4G network.

4. The AMF sends a session context request message to the PGW-C+SMF.

5. The PGW-C+SMF replies to the AMF with session context. The session context includes only bearer context whose EBI>4. Optionally, if the PGW-C+SMF or the V-SMF determines that an EBI corresponding to the default QoS flow is one of the EBI values 1 to 4, the PGW-C+SMF or the V-SMF does not reply with the session context to the AMF, or replies with empty session context to the AMF. Optionally, if the PGW-C+SMF or the V-SMF determines that an EBI corresponding to a default QoS flow is one of the EBI values 1 to 4, the PGW-C+SMF or the V-SMF may send the failure indication/cause value to the AMF, where the failure indication/cause value is used to indicate that the session cannot be handed over to the 4G network or the session handover fails. Alternatively, the failure indication/cause value may be that a value of an EBI corresponding to a default QoS flow ranges from 1 to 4 but a target MME may do not support the EBI ranging from 1 to 4, or the failure indication/cause value may be that a value of an EBI corresponding to a default QoS flow ranges from 1 to 4 but the target MME does not support an extended EBI. Optionally, before the SMF sends the failure indication/cause value to the AMF, the method further includes: the SMF determines, based on the second indication or in another manner, that the AMF updates the session context to indicate the session to be handed over from the 5G network to the 4G network.

6. The AMF sends the received session context to the MME. Optionally, if the AMF receives the failure indication/cause value sent by the PGW-C+SMF or the V-SMF, receives no session context replied by the PGW-C+SMF or the V-SMF, or receives the empty session context replied by the PGW-C+SMF or the V-SMF, the AMF determines that handover fails. The AMF may notify the MME of the handover failure, and may not perform subsequent handover steps.
7. The MME selects an SGW to create a session, sends tunnel information (the information is included in the session context) of the PGW-U+UPF to the SGW, and allocates the tunnel information of the SGW.
8. The MME sends a bearer update request to the PGW-C+SMF, and sends the tunnel information of the SGW to the PGW-C+SMF.
9. The PGW-C+SMF indicates the PGW-U+UPF to update a bearer.

Optionally, after step 9, the implementation procedure may further include a subsequent handover procedure. For example, the implementation procedure further includes procedures such as radio resource configuration and establishment of a user plane tunnel from the eNB to the SGW. For details, refer to corresponding steps specified in the standard document TS23.501 of the standardization organization (3GPP). Details are not described herein.

For example, in a scenario 2, the UE has registered with the 5G network and created a session. A location of the UE changes after the UE enters in an idle mode. For example, the UE leaves a coverage area of the 5G network or moves to a coverage area in which a signal strength of the 4G network is obviously stronger than a signal strength of the 5G network.

Figure 7A:
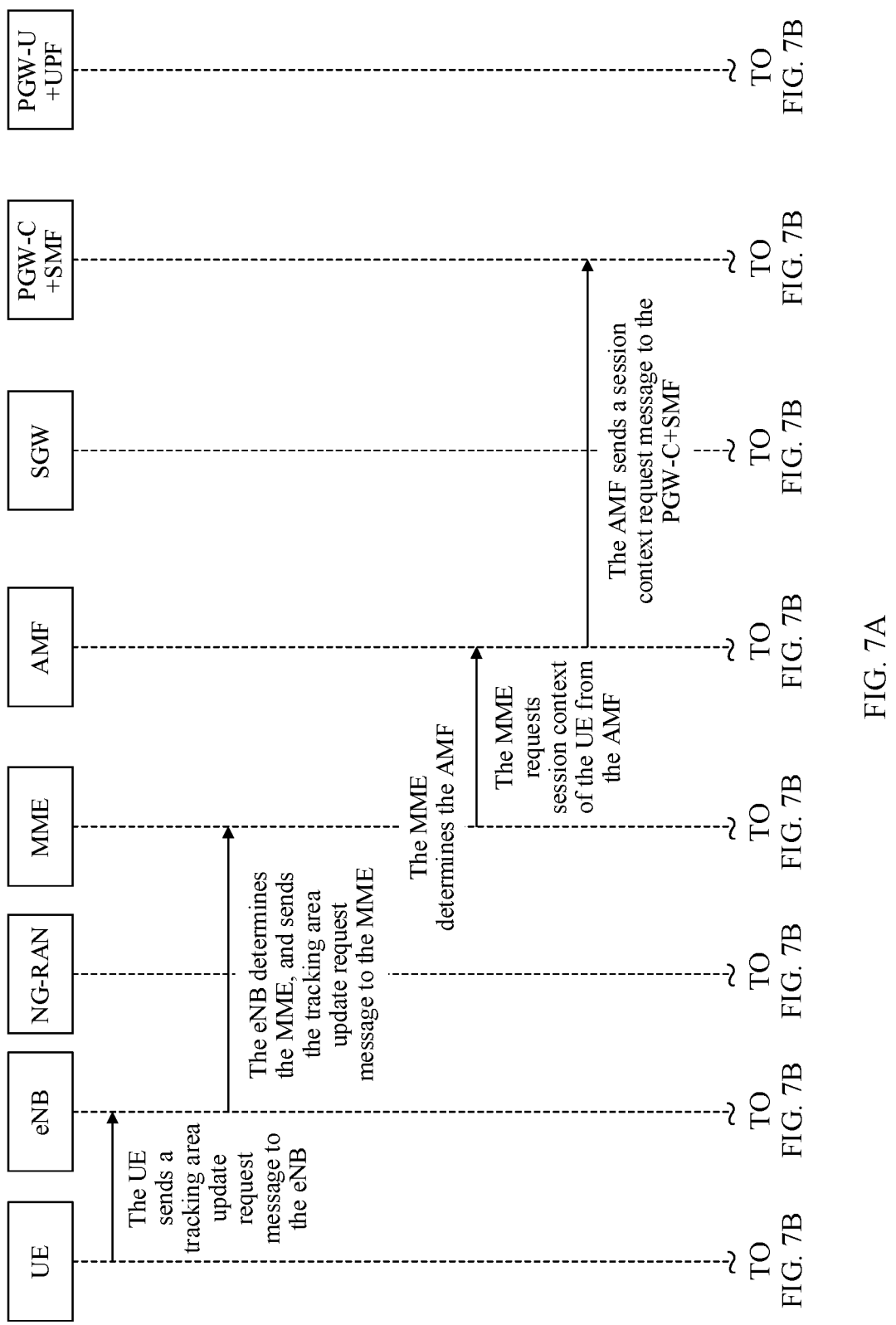
FIG. 7A and FIG. 7B are a schematic flowchart of a communication method applied to a scenario 2 according to an embodiment of this application.
Figure 7B:
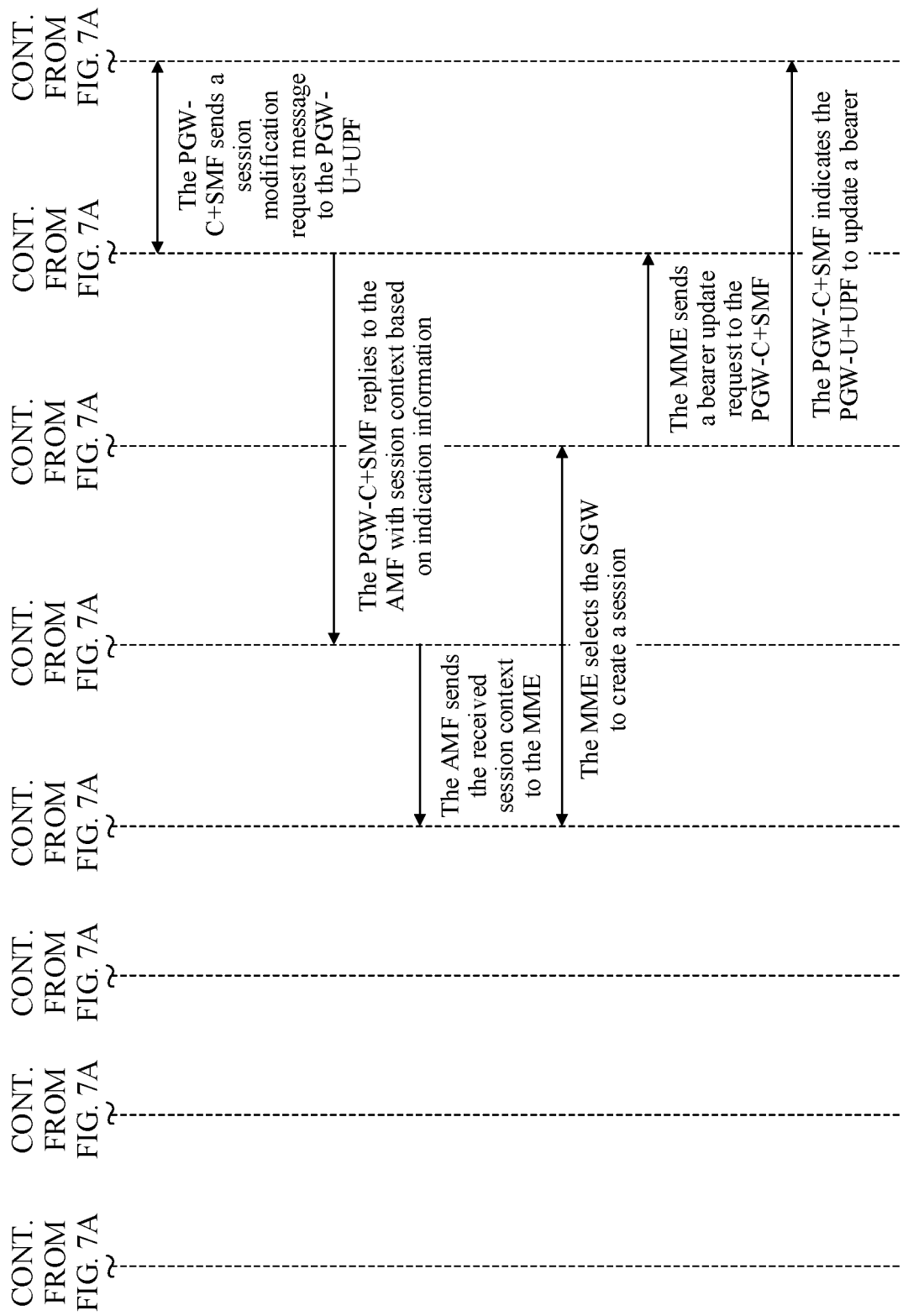

Refer to FIG. 7A and FIG. 7B. When the communication method in the embodiment in FIG. 3 is applied to the scenario 2, an implementation procedure may include the following steps.
1. The UE in the idle mode sends a tracking area update request (TAU request) message to the eNB. The TAU request includes 5G-GUTI information.
2. The eNB determines an MME, and sends the TAU request to the MME.
3. The MME determines the corresponding AMF, and requests session context of the UE from the AMF.
4. The AMF sends a session context request message to the PGW-C+SMF, where the session context request message carries indication information. For step 4, refer to step 3 in the example shown in FIG. 5. Details are not described herein again.
5. If tunnel information is allocated by the PGW-U+UPF, the PGW-C+SMF sends a session modification request message to the PGW-U+UPF. The session modification request message is used to request the PGW-U+UPF to allocate the tunnel information to each bearer.
6. The PGW-C+SMF replies to the AMF with the session context based on the indication information. For step 6, refer to step 4 in the example shown in FIG. 5. Details are not described herein again.
7. The AMF sends the received session context to the MME. Optionally, if the AMF receives the failure indication/cause value sent by the PGW-C+SMF or the V-SMF, receives no session context replied by the PGW-C+SMF or the V-SMF, or receives empty session context replied by the PGW-C+SMF or the V-SMF, the AMF determines that handover fails. The AMF may notify the MME of the handover failure, and may not perform subsequent handover steps.
8. The MME selects an SGW to create a session, sends the tunnel information of the PGW-U+UPF to the SGW, and allocates tunnel information of the SGW.
9. The MME sends a bearer update request to the PGW-C+SMF, and notifies the PGW-C+SMF of the tunnel information of the SGW.
10. The PGW-C+SMF indicates the PGW-U+UPF to update a bearer.

Optionally, after the foregoing step 10, the implementation procedure may further include a subsequent procedure for tracking area update. For details, refer to corresponding steps in the standard document TS23.501 of the standardization organization (3GPP). Details are not described herein.

Figure 8A:
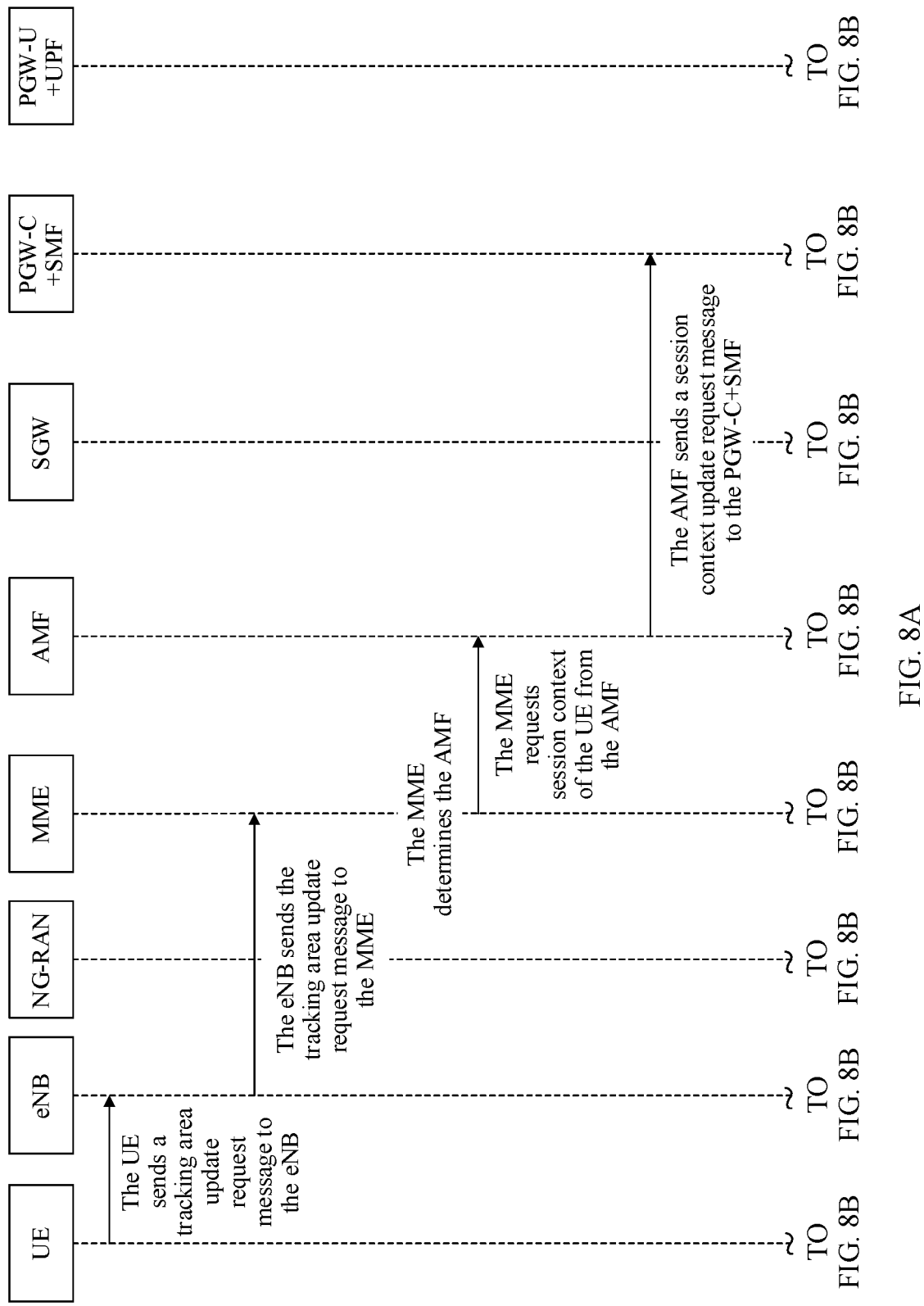

Refer to FIG. 8A and FIG. 8B. When the communication method in the embodiment in FIG. 4 is applied to the foregoing scenario 2, an implementation procedure may include the following steps.
1. The UE in the idle mode sends a tracking area update request (TAU request) message to the eNB. The TAU request includes 5G-GUTI information.
2. The eNB determines an MME, and sends the TAU request to the MME.
3. The MME determines the corresponding AMF, and requests session context of the UE from the AMF.
4. If the AMF determines that a value of an EBI that the MME supports ranges from 5 to 15, the AMF sends a session context update request message to the PGW-C+SMF, where the session context update request message carries indication information. For step 4, refer to step 3 in the example shown in FIG. 6. Details are not described herein again.
5. The AMF sends a session context request message to the PGW-C+SMF.
6. The PGW-C+SMF replies to the AMF with session context. For step 6, refer to step 5 in the example shown in FIG. 6. Details are not described herein again.
7. The AMF sends the received session context to the MME. Optionally, if the AMF receives a failure indication/cause value sent by the PGW-C+SMF or the V-SMF, receives no session context replied by the PGW-C+SMF or the V-SMF, or receives empty session context replied by the PGW-C+SMF or the V-SMF, the AMF determines that handover fails. The AMF may notify the MME of the handover failure, and may not perform subsequent handover steps.
8. The MME selects an SGW to create a session, sends tunnel information of the PGW-U+UPF to the SGW, and allocates tunnel information of the SGW.
9. The MME sends a bearer update request to the PGW-C+SMF, and notifies the PGW-C+SMF of the tunnel information of the SGW.
10. The PGW-C+SMF indicates the PGW-U+UPF to update a bearer.

Optionally, after the foregoing step 10, the implementation procedure may further include a subsequent procedure for tracking area update. For details, refer to corresponding steps in the standard document TS23.501 of the standardization organization (3GPP). Details are not described herein.

The following describes in detail related apparatuses in the embodiments of this application with reference to FIG. 9 to FIG. 14.

Figure 9:
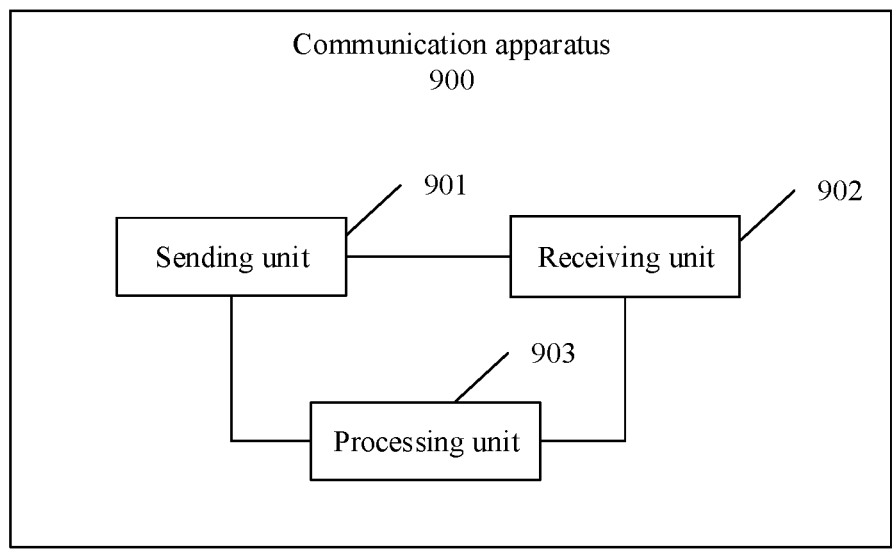
FIG. 9 is a schematic structural diagram of a communication apparatus according to an embodiment of this application.

An embodiment of this application provides a schematic structural diagram of a communication apparatus. As shown in FIG. 9, the communication apparatus 900 can be configured to implement the communication method performed by the first access management network element in the embodiment shown in FIG. 2, performed by a chip used in the first access management network element, or performed by another combined component having a function of the first access management network element. The communication apparatus 900 may include:

a sending unit 901, configured to send indication information to a session management network element in the first network, where the indication information is used to indicate the session management network element to feed back context information corresponding to a bearer of a terminal in a second network, and the bearer is a bearer that a second access management network element in the second network supports; and a receiving unit 902, configured to receive, from the session management network element, the context information corresponding to the bearer; where the sending unit 901 is configured to send the context information corresponding to the bearer to the second access management network element in the second network, where the context information corresponding to the bearer is used to indicate the terminal to move from the first network to the second network.

In an implementation, the indication information includes a quantity of bearers that the second access management network element supports;

the indication information includes that a quantity of bearers of the first network exceeds a quantity of bearers that the second access management network element supports; or the indication information includes that the second access management network element does not support an extended bearer identity.

In an implementation, the indication information includes a bearer identity of a first bearer, and the first bearer is a bearer that the second access management network element supports or does not support.

In an implementation, the indication information includes that the second access management network element in the second network supports an extended bearer identity.

In an implementation, the indication information is carried in a session context request message.

In an implementation, second indication information is carried in a session context request message, and the second indication information is used to indicate the terminal to move from the first network to the second network; or the second indication information is used to indicate the terminal to be handed over from the first network to the second network.

In an implementation, the communication apparatus 900 further includes a processing unit 903. The processing unit 903 is configured to determine the second access management network element;

determine the quantity of bearers that the second access management network element supports; or determine a range of bearer identities that the second access management network element supports.

In an implementation, the receiving unit 902 is further configured to receive a handover request message sent by an access network device in the first network, where the handover request message is used to request for handover from the first network to the second network.

In an implementation, the receiving unit 902 is further configured to receive a session context request message sent by the second access management network element in the second network.

It should be noted that, for content that is not described in the embodiment corresponding to FIG. 9 and specific implementations of steps performed by the units, refer to the embodiment and the foregoing content shown in FIG. 2. Details are not described herein again.

It should be noted that the sending unit can implement a signal sending operation of the first access management network element in the foregoing method embodiment, the receiving unit can implement a signal receiving operation of the first access management network element in the foregoing method embodiment, and the processing unit can implement a signal processing operation of the first access management network element in the foregoing method embodiment.

Figure 10:
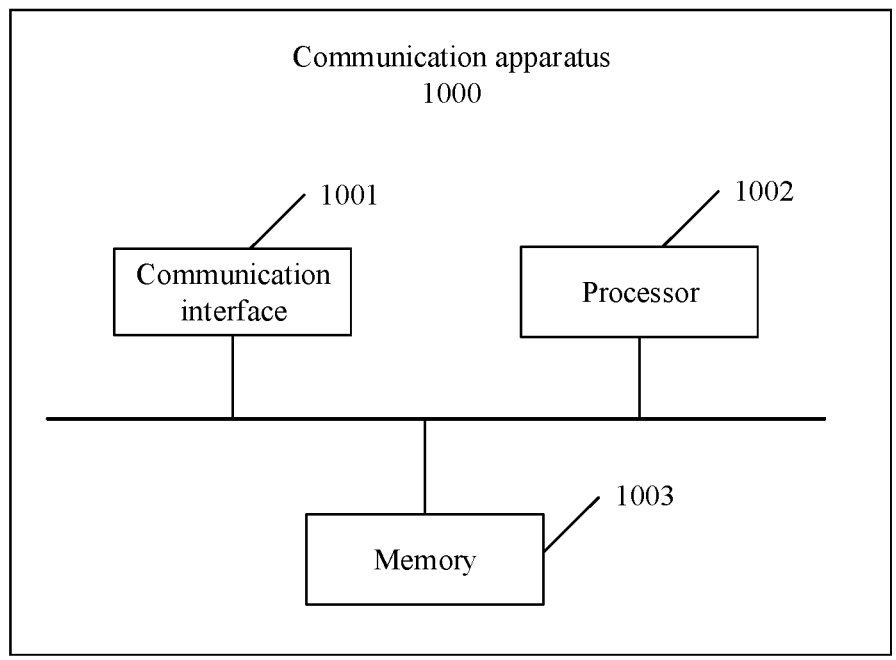
FIG. 10 is a schematic structural diagram of a communication apparatus according to an embodiment of this application.

In an implementation, related functions implemented by the units in FIG. 9 can be implemented through a combination of a processor and a communication interface. FIG. 10 is a schematic structural diagram of another communication apparatus according to an embodiment of this application. The apparatus may be a first access management network element or an apparatus (for example, a chip) having a function of a first access management network element. The communication apparatus 1000 may include a communication interface 1001, at least one processor 1002, and a memory 1003. The communication interface 1001, the processor 1002, and the memory 1003 may be connected to each other through one or more communication buses, or may be connected to each other in another manner.

The communication interface 1001 may be configured to send data and/or signaling, and receive data and/or signaling. It can be understood that the communication interface 1001 is an umbrella term, and there may be one or more interfaces. For example, the communication interface 1001 includes an interface between the communication apparatus and another device.

The processor 1002 may be configured to process the data and/or signaling sent by the communication interface 1001, or process the data and/or signaling received from the communication interface 1001. For example, the processor 1002 may invoke program code stored in the memory 1003, to implement a communication process through the communication interface 1001. The processor 1002 may include one or more processors. For example, the processor 1002 may be one or more central processing units (CPU), one or more network processors (NP), one or more hardware chips, or any combination thereof. When the processor 1002 includes one CPU, the CPU may be a single-core CPU, or may be a multi-core CPU.

The memory 1003 is configured to store the program code and the like. The memory 1003 may include a volatile memory, for example, a random access memory (RAM). Alternatively, the memory 1003 may include a non-volatile memory, for example, a read-only memory (ROM), a flash memory, a hard disk drive (HDD), or a solid-state drive (SSD). Alternatively, the memory 1003 may include a combination of the foregoing types of memories.

The communication interface 1001 and the processor 1002 can be configured to implement the communication method performed by the first access management network element in the embodiment shown in FIG. 2. The processor 1002 invokes the code in the memory 1003 to specifically perform the following steps:

sending, through the communication interface 1001, indication information to a session management network element in the first network, where the indication information is used to indicate the session management network element to feed back context information corresponding to a bearer of a terminal in a second network, and the bearer is a bearer that a second access management network element in the second network supports;

receiving, from the session management network element through the communication interface 1001, the context information corresponding to the bearer; and sending, through the communication interface 1001, the context information corresponding to the bearer to the second access management network element in the second network, where the context information corresponding to the bearer is used to indicate the terminal to move from the first network to the second network.

In an implementation, the indication information includes a quantity of bearers that the second access management network element supports;

the indication information includes that a quantity of bearers of the first network exceeds a quantity of bearers that the second access management network element supports; or the indication information includes that the second access management network element does not support an extended bearer identity.

In an implementation, the indication information includes a bearer identity of a first bearer, and the first bearer is a bearer that the second access management network element supports or does not support.

In an implementation, the indication information is carried in a session context request message.

In an implementation, the processor 1002 may invoke the code in the memory 1003 to further perform the following step:

determining the second access management network element supports; or determining the quantity of bearers that the second access management network element supports; or determining a range of bearer identities that the second access management network element supports.

In an implementation, the processor 1002 may invoke the code in the memory 1003 to further perform the following step:

receiving, through the communication interface 1001, a handover request message sent by an access network device in the first network, where the handover request message is used to request for handover from the first network to the second network.

In an implementation, the processor 1002 may invoke the code in the memory 1003 to further perform the following step:

receiving, through the communication interface 1001, the session context request message sent by the second access management network element in the second network.

It should be noted that the communication interface can implement signal receiving and sending operations of the first access management network element in the foregoing method embodiment, and the processor can implement a signal processing operation of the first access management network element in the foregoing method embodiment.

Figure 11:
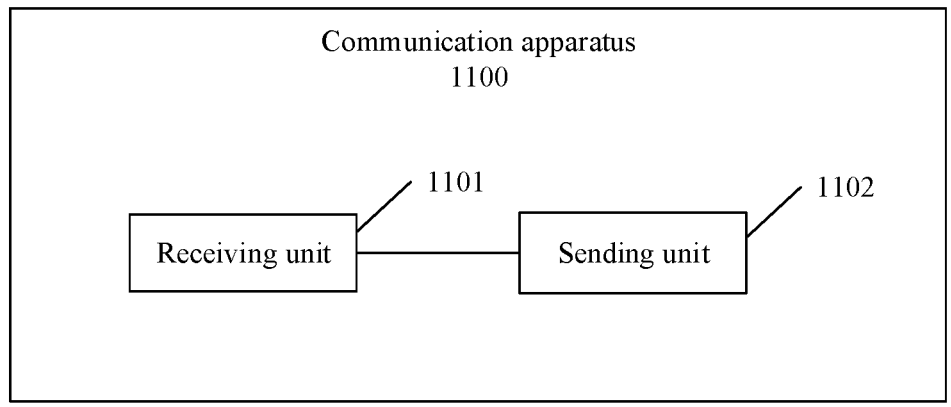
FIG. 11 is a schematic structural diagram of a communication apparatus according to an embodiment of this application.

An embodiment of this application provides a schematic structural diagram of a communication apparatus. As shown in FIG. 11, the communication apparatus 1100 can be configured to implement the communication method performed by the session management network element in the embodiment shown in FIG. 2, performed by a chip used in the session management network element, or performed by another combined component having a function of the session management network element. The communication apparatus 1100 may include:

a receiving unit 1101, configured to receive indication information sent by a first access management network element in the first network, where the indication information is used to indicate the session management network element to feed back context information corresponding to a bearer of a terminal in a second network, and the bearer is a bearer that a second access management network element in the second network supports; and a sending unit 1102, configured to send the context information corresponding to the bearer to the first access management network element.

In an implementation, the indication information includes a quantity of bearers that the second access management network element supports;

the indication information includes that a quantity of bearers of the first network exceeds a quantity of bearers that the second access management network element supports; or the indication information includes that the second access management network element does not support an extended bearer identity.

In an implementation, the indication information includes a bearer identity of a first bearer, and the first bearer is a bearer that the second access management network element supports or does not support.

In an implementation, the indication information is carried in a session context request message.

In an implementation, second indication information is carried in a session context request message, and the second indication information is used to indicate the terminal to move from the first network to the second network; or the second indication information is used to indicate the terminal to be handed over from the first network to the second network.

In an implementation, the indication information is further used to indicate to allocate tunnel information corresponding to the bearer that the second access management network element in the second network supports.

It should be noted that, for content that is not described in the embodiment corresponding to FIG. 11 and specific implementations of steps performed by the units, refer to the embodiment and the foregoing content shown in FIG. 2. Details are not described herein again.

It should be noted that the sending unit can implement a signal sending operation of the session management network element in the foregoing method embodiment, the receiving unit can implement a signal receiving operation of the session management network element in the foregoing method embodiment, and the processing unit can implement a signal processing operation of the session management network element in the foregoing method embodiment.

Figure 12:
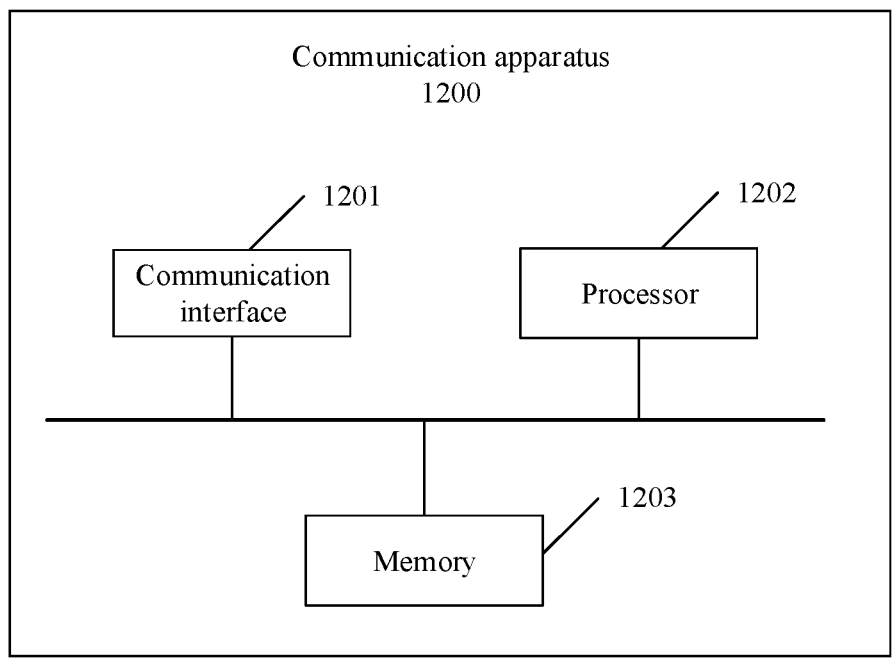
FIG. 12 is a schematic structural diagram of a communication apparatus according to an embodiment of this application.

In an implementation, related functions implemented by the units in FIG. 11 can be implemented through a combination of a processor and a communication interface. FIG. 12 is a schematic structural diagram of another communication apparatus according to an embodiment of this application. The apparatus may be a session management network element or an apparatus (for example, a chip) having a function of a session management network element. The communication apparatus 1200 may include a communication interface 1201, at least one processor 1202, and a memory 1203. The communication interface 1201, the processor 1202, and the memory 1203 may be connected to each other through one or more communication buses, or may be connected to each other in another manner.

The communication interface 1201 may be configured to send data and/or signaling, and receive data and/or signaling. It can be understood that the communication interface 1201 is an umbrella term, and there may be one or more interfaces. For example, the communication interface 1201 includes an interface between the communication apparatus and another device.

The processor 1202 may be configured to process the data and/or signaling sent by the communication interface 1201, or process the data and/or signaling received from the communication interface 1201. For example, the processor 1202 may invoke program code stored in the memory 1203, to implement a communication process through the communication interface 1201. The processor 1202 may include one or more processors. For example, the processor 1202 may be one or more central processing units (CPU), one or more network processors (NP), one or more hardware chips, or any combination thereof. When the processor 1202 includes one CPU, the CPU may be a single-core CPU, or may be a multi-core CPU.

The memory 1203 is configured to store the program code and the like. The memory 1203 may include a volatile memory, for example, a random access memory (RAM). Alternatively, the memory 1203 may include a non-volatile memory, for example, a read-only memory (ROM), a flash memory, a hard disk drive (HDD), or a solid-state drive (SSD). Alternatively, the memory 1203 may include a combination of the foregoing types of memories.

The communication interface 1201 and the processor 1202 can be configured to implement the communication method performed by the session management network element in the embodiment shown in FIG. 2. The processor 1202 invokes the code in the memory 1203 to specifically perform the following steps:

receiving, through the communication interface 1201, indication information sent by a first access management network element in the first network, where the indication information is used to indicate the session management network element to feed back context information corresponding to a bearer of a terminal in a second network, and the bearer is a bearer that a second access management network element in the second network supports; and sending, through the communication interface 1201, the context information corresponding to the bearer to the first access management network element.

In an implementation, the indication information includes a quantity of bearers that the second access management network element supports;

the indication information includes that a quantity of bearers of the first network exceeds a quantity of bearers that the second access management network element supports; or the indication information includes that the second access management network element does not support an extended bearer identity.

In an implementation, the indication information includes a bearer identity of a first bearer, and the first bearer is a bearer that the second access management network element supports or does not support.

In an implementation, the indication information is carried in a session context request message.

In an implementation, the indication information is further used to indicate to allocate tunnel information corresponding to the bearer that the second access management network element in the second network supports.

It should be noted that the communication interface can implement signal receiving and sending operations of the session management network element in the foregoing method embodiment, and the processor can implement a signal processing operation of the session management network element in the foregoing method embodiment.

Figure 13:
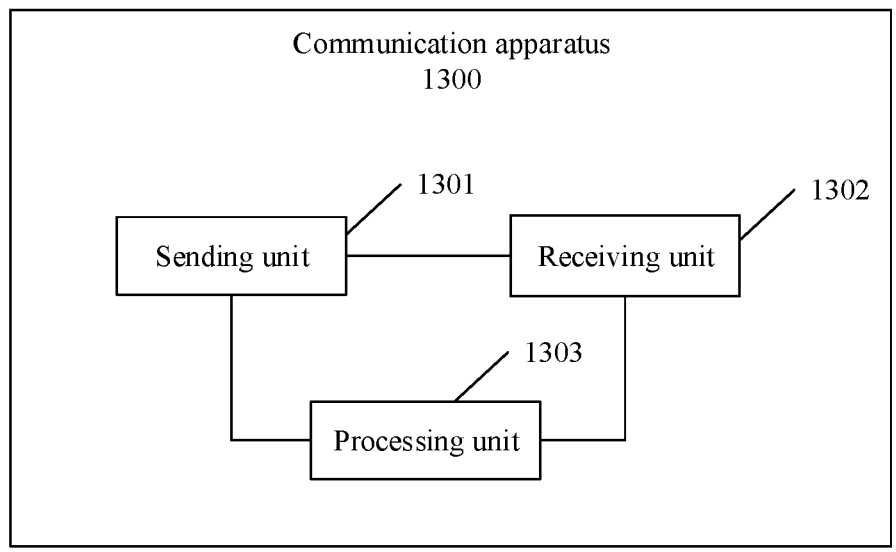
FIG. 13 is a schematic structural diagram of a communication apparatus according to an embodiment of this application.

An embodiment of this application provides a schematic structural diagram of a communication apparatus. As shown in FIG. 13, the communication apparatus 1300 can be configured to implement the communication method performed by the first access management network element in the embodiment shown in FIG. 3. The communication apparatus 1300 may include:

a sending unit 1301, configured to send indication information to a session management network element in the first network, where the indication information is used to indicate the session management network element to release context information corresponding to a first bearer of a terminal in a second network, and the first bearer is a bearer that the second access management network element does not support, where the sending unit 1301 is further configured to send a session context request message to the session management network element; and a receiving unit 1302, configured to receive, from the session management network element, context information corresponding to a second bearer, where the second bearer is a bearer that the second access management network element supports, where the sending unit 1301 is further configured to send session context information corresponding to the second bearer to the second access management network element in the second network, where the session context information corresponding to the second bearer is used to indicate the terminal to move from the first network to the second network.

In an implementation, the indication information includes that the second access management network element in the second network does not support an extended bearer identity.

In an implementation, the indication information is carried in a session context update request message.

In an implementation, second indication information is carried in the session context request message, and the second indication information is used to indicate the terminal to move from the first network to the second network; or the second indication information is used to indicate the terminal to be handed over from the first network to the second network.

In an implementation, the communication apparatus 1300 further includes a processing unit 1303. The processing unit 1303 is configured to determine the second access management network element;
  determine a quantity of bearers that the second access management network element supports; or
  determine a range of bearer identities that the second access management network element supports.

In an implementation, the receiving unit 1302 is further configured to receive a handover request message sent by an access network device in the first network, where the handover request message is used to request for handover from the first network to the second network.

In an implementation, the receiving unit 1302 is further configured to receive the session context request message sent by the second access management network element in the second network.

It should be noted that, for content that is not described in the embodiment corresponding to FIG. 13 and specific implementations of steps performed by the units, refer to the embodiment and the foregoing content shown in FIG. 3. Details are not described herein again.

It should be noted that the sending unit can implement a signal sending operation of the first access management network element in the foregoing method embodiment, the receiving unit can implement a signal receiving operation of the first access management network element in the foregoing method embodiment, and the processing unit can implement a signal processing operation of the first access management network element in the foregoing method embodiment.

Figure 14:
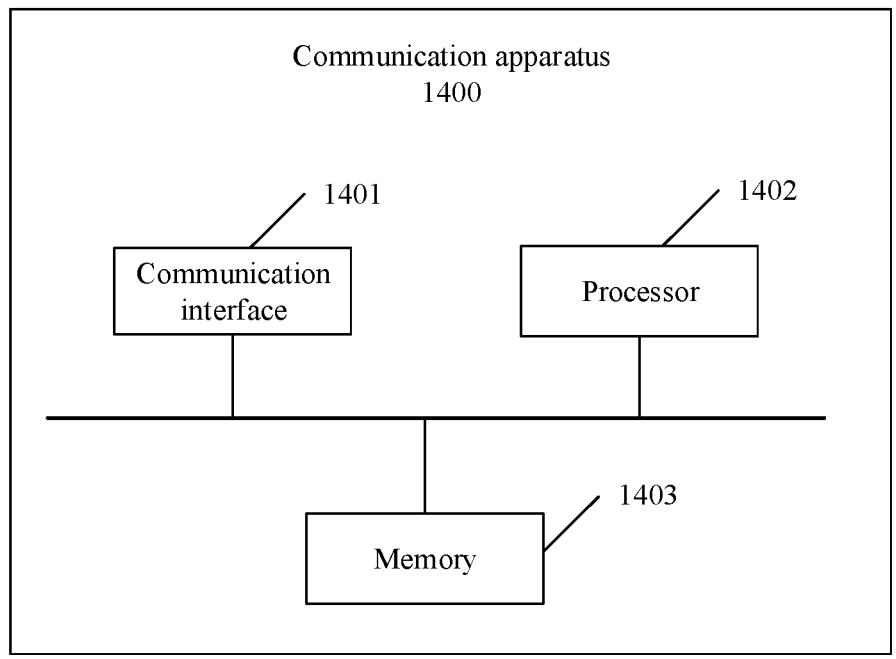
FIG. 14 is a schematic structural diagram of a communication apparatus according to an embodiment of this application.

In an implementation, related functions implemented by the units in FIG. 13 can be implemented through a combination of a processor and a communication interface. FIG. 14 is a schematic structural diagram of another communication apparatus according to an embodiment of this application. The apparatus may be a first access management network element or an apparatus (for example, a chip) having a function of a first access management network element. The communication apparatus 1400 may include a communication interface 1401, a processor 1402, and a memory 1403. The communication interface 1401, the processor 1402, and the memory 1403 may be connected to each other through one or more communication buses, or may be connected to each other in another manner.

The communication interface 1401 may be configured to send data and/or signaling, and receive data and/or signaling. It can be understood that the communication interface 1401 is an umbrella term, and there may be one or more interfaces. For example, the communication interface 1401 includes an interface between the communication apparatus and another device.

The processor 1402 may be configured to process the data and/or signaling sent by the communication interface 1401, or process the data and/or signaling received from the communication interface 1401. For example, the processor 1402 may invoke program code stored in the memory 1403, to implement a communication process through the communication interface 1401. The processor 1402 may include one or more processors. For example, the processor 1402 may be one or more central processing units (CPU), one or more network processors (NP), one or more hardware chips, or any combination thereof. When the processor 1402 includes one CPU, the CPU may be a single-core CPU, or may be a multi-core CPU.

The memory 1403 is configured to store the program code and the like. The memory 1403 may include a volatile memory, for example, a random access memory (RAM). Alternatively, the memory 1403 may include a non-volatile memory, for example, a read-only memory (ROM), a flash memory, a hard disk drive (HDD), or a solid-state drive (SSD). Alternatively, the memory 1403 may include a combination of the foregoing types of memories.

The communication interface 1401 and the processor 1402 can be configured to implement the communication method performed by the first access management network element in the embodiment shown in FIG. 3. The processor 1402 invokes the code in the memory 1403 to specifically perform the following steps:
  sending, through the communication interface 1401, indication information to a session management network element in the first network, where the indication information is used to indicate the session management network element to release context information corresponding to a first bearer of a terminal in a second network, and the first bearer is a bearer that the second access management network element does not support;
  sending, through the communication interface 1401, a session context request message to the session management network element;
  receiving, from the session management network element through the communication interface 1401, context information corresponding to a second bearer, where the second bearer is a bearer that the second access management network element supports; and
  sending, through the communication interface 1401, session context information corresponding to the second bearer to the second access management network element in the second network, where the session context information corresponding to the second bearer is used to indicate the terminal to move from the first network to the second network.

In an implementation, the indication information includes that the second access management network element in the second network does not support an extended bearer identity.

In an implementation, the indication information is carried in a session context update request message.

In an implementation, second indication information is carried in the session context request message, and the second indication information is used to indicate the terminal to move from the first network to the second network; or
  the second indication information is used to indicate the terminal to be handed over from the first network to the second network.

In an implementation, the processor 1402 may invoke the code in the memory 1403 to further perform the following step:
  determining the second access management network element;
  determining a quantity of bearers that the second access management network element supports; or
  determining a range of bearer identities that the second access management network element supports.

In an implementation, the processor 1402 may invoke the code in the memory 1403 to further perform the following step:
  receiving, through the communication interface 1401, a handover request message sent by an access network device in the first network, where the handover request message is used to request for handover from the first network to the second network.

In an implementation, the processor 1402 may invoke the code in the memory 1403 to further perform the following step:

receiving, through the communication interface 1401, the session context request message sent by the second access management network element in the second network.

It should be noted that the communication interface can implement signal receiving and sending operations of the first access management network element in the foregoing method embodiment, and the processor can implement a signal processing operation of the first access management network element in the foregoing method embodiment.

In this embodiment of this application, the sending unit and the receiving unit may be a transceiver, a transceiver circuit, or a transceiver chip. The processing unit may be a processor.

An embodiment of this application further provides a computer-readable storage medium. The computer-readable storage medium includes a program or instructions, and when the program or the instructions is or are run on a computer, the computer is enabled to perform the communication method performed by the first access management network element in the foregoing method embodiment.

An embodiment of this application further provides a computer-readable storage medium. The computer-readable storage medium includes a program or instructions, and when the program or the instructions is or are run on a computer, the computer is enabled to perform the communication method performed by the session management network element in the foregoing method embodiment.

All or a part of the foregoing embodiments may be implemented by using software, hardware, firmware, or any combination thereof in the foregoing embodiments. When software is used to implement the embodiments, all or a part of the embodiments may be implemented in a form of a computer program product. The computer program product includes one or more computer instructions. When the one or more computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the one or more computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

A person of ordinary skill in the art may be aware that, the units and steps in the examples described with reference to the embodiments disclosed herein may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
sending, by a first access management network element in a first network to a session management network element in the first network, a bearer identity of a bearer that cannot be transferred to a second access management network element in a second network and that belongs to a terminal;
when the bearer identity is not associated with a default QoS flow of a session in the first network, receiving, by the first access management network element from the session management network element, bearer context information, wherein the bearer context information excludes bearer context associated with the bearer identity that cannot be transferred; and
sending, by the first access management network element, the bearer context information to the second access management network element, wherein the bearer context information is for moving the terminal from the first network to the second network.

2. The method according to claim 1, wherein before the sending the bearer identity to the session management network element, the method further comprises:
determining, by the first access management network element, the bearer identity of the bearer that cannot be transferred to the second access management network element and that belongs to the terminal.

3. The method according to claim 1, wherein the bearer identity is carried in a session context request message.

4. The method according to claim 2, wherein the determining, by the first access management network element, the bearer identity of the bearer that cannot be transferred to the second access management network element and that belongs to the terminal comprises:
when a quantity of bearer identities with values ranging from 5 to 15 is greater than a quantity of bearers that the second access management network element supports, determining, by the first access management network element, a part of the bearer identities with values ranging from 5 to 15, as the bearer identity of the bearer that cannot be transferred to the second access management network element.

5. The method according to claim 4, wherein the quantity of bearers that the second access management network element supports and that belongs to the terminal is less than or equal to 8.

6. The method according to claim 4, wherein the determining, by the first access management network element the part of the bearer identities with values ranging from 5 to 15, as the bearer identity of the bearer that cannot be transferred to the second access management network element comprises:

removing, by the first access management network element, eight bearer identities from the bearer identities with values ranging from 5 to 15, and determining a remaining bearer identity as the bearer identity of the bearer that cannot be transferred to the second access management network element.

7. The method according to claim 1, wherein a value of the bearer identity of the bearer that cannot be transferred to the second access management network element comprises a value ranging from 1 to 4.

8. The method according to claim 4, wherein the method further comprises:

determining, by the first access management network element, the quantity of bearers that the second access management network element supports.

9. The method according to claim 1, wherein the method further comprises:

receiving, by the first access management network element, a handover request message from an access network device in the first network, wherein the handover request message requests the terminal to be handed over from the first network to the second network.

10. The method according to claim 1, wherein the first network is a 5G network, and the second network is an evolved packet system (EPS).

11. A first access management network element, comprising:

at least one processor; and
    at least one memory, storing computer instructions, which when executed by the at least one processor, cause the first access management network element to:
    send, to a session management network element in a first network, a bearer identity of a bearer that cannot be transferred to a second access management network element and that belongs to a terminal;
    when the bearer identity is not associated with a default QoS flow of a session in the first network, receive, from the session management network element, bearer context information, wherein the bearer context information excludes bearer context associated with the bearer identity that cannot be transferred; and
    send the bearer context information to the second access management network element, wherein the bearer context information is for moving the terminal from the first network to a second network.

12. The first access management network element according to claim 11, wherein the at least one memory, storing computer instructions, which when executed by the at least one processor, further cause the first access management network element to:

determine the bearer identity of the bearer that cannot be transferred to the second access management network element and that belongs to the terminal before sending the bearer identity to the session management network element.

13. The first access management network element according to claim 11, wherein the bearer identity is carried in a session context request message.

14. The first access management network element according to claim 12, wherein the at least one memory, storing computer instructions, which when executed by the at least one processor, cause the first access management network element to:

when a quantity of bearer identities with values ranging from 5 to 15 is greater than a quantity of bearers that the second access management network element supports, determine, a part of the bearer identities with values ranging from 5 to 15, as the bearer identity of the bearer that cannot be transferred to the second access management network element.

15. The first access management network element according to claim 14, wherein the quantity of bearers that the second access management network element supports and that belongs to the terminal is less than or equal to 8.

16. The first access management network element according to claim 14, wherein the at least one memory, storing computer instructions, which when executed by the at least one processor, cause the first access management network element to:

remove eight bearer identities from the bearer identities with values ranging from 5 to 15, and determining a remaining bearer identity as the bearer identity of the bearer that cannot be transferred to the second access management network element.

17. The first access management network element according to claim 11, wherein a value of the bearer identity of the bearer that cannot be transferred to the second access management network element comprises a value ranging from 1 to 4.

18. The first access management network element according to claim 14, the at least one memory, storing computer instructions, which when executed by the at least one processor, cause the first access management network element to:

determine the quantity of bearers that the second access management network element supports.

19. The first access management network element according to claim 11, wherein the at least one memory, storing computer instructions, which when executed by the at least one processor, cause the first access management network element to:

receive a handover request message from an access network device in the first network, wherein the handover request message requests the terminal to be handed over from the first network to the second network.

20. The first access management network element according to claim 11, wherein the first network is a 5G network, and the second network is an evolved packet system (EPS).

* * * * *